(12) United States Patent
Agrawal et al.

(10) Patent No.: US 10,528,931 B1
(45) Date of Patent: Jan. 7, 2020

(54) HOSTED PAYMENT SERVICE SYSTEM AND METHOD

(71) Applicant: Amazon Technologies, Inc., Seattle, WA (US)

(72) Inventors: Ashish Agrawal, Seattle, WA (US); Mohammed Sujayath Ali, Seattle, WA (US); Sravana Kumar Karnati, Sammamish, WA (US); James Vernon Reagan, Snoqualmie, WA (US); Dilip Kumar Sivasankar, Bangalore (IN); Mark V. Stabingas, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 374 days.

(21) Appl. No.: 15/078,958

(22) Filed: Mar. 23, 2016

Related U.S. Application Data

(63) Continuation of application No. 12/265,554, filed on Nov. 5, 2008, now Pat. No. 9,324,098.
(Continued)

(51) Int. Cl.
*G06Q 20/12* (2012.01)
*G06Q 30/06* (2012.01)
(Continued)

(52) U.S. Cl.
CPC .......... *G06Q 20/12* (2013.01); *G06Q 20/383* (2013.01); *G06Q 20/401* (2013.01);
(Continued)

(58) Field of Classification Search
CPC ...................................................... G06Q 20/12
(Continued)

(56) References Cited

U.S. PATENT DOCUMENTS

| 5,671,279 A | 9/1997 | Elgamal |
| 5,715,314 A | 2/1998 | Payne et al. |

(Continued)

FOREIGN PATENT DOCUMENTS

| EP | 0 793 203 A2 | 9/1997 |
| EP | 1 168 264 A2 | 1/2002 |
| WO | WO 01/43033 A1 | 6/2011 |

OTHER PUBLICATIONS

Instabuy Merchant FAQ Sep. 2, 1999 4 pages from the internet (Year: 1999).*

(Continued)

*Primary Examiner* — Bruce I Ebersman
(74) *Attorney, Agent, or Firm* — Knobbe, Martens, Olson & Bear, LLP

(57) ABSTRACT

Various embodiments of a hosted payment service are disclosed. In some embodiments, a merchant can enable customer use of the payment service by adding a line or sequence of widget code to a web page, such as a shopping cart page, of the merchant's site. Thereafter, a user who is registered with the payment service can invoke the payment service and complete a purchase transaction directly from the merchant site. For example, while viewing a shopping cart page, the user may be able to securely interact with the payment service and complete the purchase transaction via a transaction display object that is incorporated into the shopping cart page. In some embodiments, the transaction display object prompts the registered customer to enter a secondary authentication input, and the payment service uses this input in combination with a browser cookie to authenticate the user.

16 Claims, 12 Drawing Sheets

Related U.S. Application Data

(60) Provisional application No. 61/082,813, filed on Jul. 22, 2008.

(51) Int. Cl.
*G06Q 20/38* (2012.01)
*G06Q 20/40* (2012.01)

(52) U.S. Cl.
CPC ..... *G06Q 30/0615* (2013.01); *G06Q 30/0635* (2013.01); *G06Q 30/0641* (2013.01)

(58) Field of Classification Search
USPC .......................................................... 705/26
See application file for complete search history.

(56) References Cited

U.S. PATENT DOCUMENTS

| | | | |
|---|---|---|---|
| 5,724,424 A | 3/1998 | Gifford | |
| 5,757,917 A | 5/1998 | Rose et al. | |
| 5,815,665 A | 9/1998 | Teper et al. | |
| 5,878,141 A | 3/1999 | Daly et al. | |
| 5,890,137 A | 3/1999 | Koreeda | |
| 5,903,652 A | 5/1999 | Mital | |
| 5,903,721 A | 5/1999 | Sixtus | |
| 5,903,878 A | 5/1999 | Talati et al. | |
| 5,956,483 A | 9/1999 | Grate et al. | |
| 5,960,411 A | 9/1999 | Hartman et al. | |
| 6,005,939 A | 12/1999 | Fortenberry et al. | |
| 6,021,397 A | 2/2000 | Jones et al. | |
| 6,070,142 A | 5/2000 | McDonough et al. | |
| 6,078,902 A | 6/2000 | Schenkler | |
| 6,092,053 A | 7/2000 | Boesch et al. | |
| 6,092,196 A | 7/2000 | Reiche | |
| 6,275,824 B1 | 8/2001 | O'Flaherty et al. | |
| 6,327,578 B1 | 12/2001 | Linehan | |
| 6,332,134 B1 | 12/2001 | Foster | |
| 6,490,601 B1 | 12/2002 | Markus et al. | |
| 6,516,416 B2 | 2/2003 | Gregg et al. | |
| 6,601,761 B1 | 8/2003 | Katis | |
| 6,957,334 B1 | 10/2005 | Goldstein et al. | |
| 6,970,852 B1 | 11/2005 | Sendo | |
| 7,076,445 B1 | 7/2006 | Cartwright | |
| 7,146,341 B1 | 12/2006 | Light et al. | |
| 7,155,411 B1 * | 12/2006 | Blinn | G06Q 20/02 705/40 |
| 7,194,437 B1 | 3/2007 | Britto et al. | |
| 7,349,867 B2 | 3/2008 | Rollins | |
| 7,356,507 B2 | 4/2008 | Bezos et al. | |
| 7,457,778 B2 | 11/2008 | Li et al. | |
| 7,499,889 B2 | 3/2009 | Golan et al. | |
| 7,502,760 B1 | 3/2009 | Gupta | |
| 7,536,351 B2 | 5/2009 | Leblang et al. | |
| 7,658,324 B2 | 2/2010 | Gindele | |
| 7,685,067 B1 | 3/2010 | Britto et al. | |
| 7,809,608 B2 * | 10/2010 | Kassan | G06Q 20/4012 705/12 |
| 7,877,299 B2 | 1/2011 | Bui | |
| 7,966,259 B1 | 6/2011 | Bui | |
| 7,975,019 B1 | 7/2011 | Green et al. | |
| 7,975,020 B1 | 7/2011 | Green et al. | |
| 8,160,935 B2 | 4/2012 | Bui | |
| 8,271,878 B2 | 9/2012 | Kane et al. | |
| 8,355,959 B2 | 1/2013 | Bui | |
| 8,370,749 B2 | 2/2013 | Morse | |
| 8,374,958 B2 | 2/2013 | Blott et al. | |
| 8,423,420 B1 | 4/2013 | Bhosle et al. | |
| 8,533,054 B1 | 9/2013 | Haney | |
| 8,595,186 B1 | 11/2013 | Mandyam et al. | |
| 8,626,665 B2 | 1/2014 | Bui | |
| 8,689,099 B1 | 4/2014 | Hanni et al. | |
| 8,689,124 B2 * | 4/2014 | Amacker | G06Q 30/0603 705/27.1 |
| 8,713,418 B2 | 4/2014 | King et al. | |
| 8,996,408 B1 | 3/2015 | Carver et al. | |
| 9,324,098 B1 | 4/2016 | Agrawal et al. | |
| 9,747,621 B1 | 8/2017 | Kuruvila | |
| 2001/0042785 A1 | 11/2001 | Walker et al. | |
| 2001/0044787 A1 | 11/2001 | Swartz et al. | |
| 2002/0072980 A1 | 6/2002 | Dutta | |
| 2002/0112171 A1 | 8/2002 | Ginter et al. | |
| 2002/0120567 A1 | 8/2002 | Caplan et al. | |
| 2002/0144119 A1 | 10/2002 | Benantar | |
| 2003/0014519 A1 | 1/2003 | Bowers et al. | |
| 2003/0236711 A1 | 12/2003 | Deguchi | |
| 2004/0025056 A1 | 2/2004 | Katsube | |
| 2004/0030615 A1 | 2/2004 | Ling | |
| 2004/0117302 A1 | 6/2004 | Weichert et al. | |
| 2004/0148232 A1 | 7/2004 | Fushimi et al. | |
| 2004/0235450 A1 | 11/2004 | Rosenberg | |
| 2005/0091111 A1 | 4/2005 | Green et al. | |
| 2005/0210270 A1 | 9/2005 | Rohatgi et al. | |
| 2005/0216421 A1 | 9/2005 | Barry et al. | |
| 2006/0064380 A1 | 3/2006 | Zukerman | |
| 2006/0218052 A1 | 9/2006 | Haynes et al. | |
| 2006/0218630 A1 | 9/2006 | Pearson et al. | |
| 2006/0229884 A1 | 10/2006 | Grundhoff et al. | |
| 2006/0229998 A1 | 10/2006 | Harrison et al. | |
| 2007/0027696 A1 | 2/2007 | Burger | |
| 2007/0050307 A1 | 3/2007 | Light et al. | |
| 2007/0061328 A1 | 3/2007 | Ramer et al. | |
| 2007/0180508 A1 | 8/2007 | Thomson | |
| 2007/0186106 A1 | 8/2007 | Ting et al. | |
| 2007/0199053 A1 | 8/2007 | Sandhu et al. | |
| 2007/0203850 A1 | 8/2007 | Singh et al. | |
| 2007/0244811 A1 | 10/2007 | Tumminaro | |
| 2007/0245022 A1 | 10/2007 | Olliphant et al. | |
| 2007/0255653 A1 | 11/2007 | Tumminaro et al. | |
| 2007/0271192 A1 | 11/2007 | Brunet et al. | |
| 2007/0299732 A1 | 12/2007 | Gluzberg et al. | |
| 2008/0010112 A1 | 1/2008 | Kniaz et al. | |
| 2008/0010298 A1 | 1/2008 | Steele et al. | |
| 2008/0033879 A1 | 2/2008 | Blinn et al. | |
| 2008/0040681 A1 | 2/2008 | Synstelien et al. | |
| 2008/0071725 A1 | 3/2008 | Raskin et al. | |
| 2008/0097842 A1 | 4/2008 | Tirumala et al. | |
| 2008/0097843 A1 | 4/2008 | Menon et al. | |
| 2008/0097871 A1 | 4/2008 | Williams et al. | |
| 2008/0097906 A1 | 4/2008 | Williams et al. | |
| 2008/0098325 A1 | 4/2008 | Williams et al. | |
| 2008/0104496 A1 | 5/2008 | Williams et al. | |
| 2008/0126145 A1 | 5/2008 | Rackley, III et al. | |
| 2008/0183593 A1 | 7/2008 | Dierks | |
| 2008/0189186 A1 | 8/2008 | Choi et al. | |
| 2008/0235123 A1 | 9/2008 | Olliphant et al. | |
| 2008/0270417 A1 | 10/2008 | Roker | |
| 2008/0270909 A1 | 10/2008 | Kaufman et al. | |
| 2008/0288405 A1 | 11/2008 | John | |
| 2008/0319869 A1 | 12/2008 | Carlson | |
| 2008/0319914 A1 | 12/2008 | Carrott | |
| 2009/0144066 A1 | 6/2009 | Van Luchene et al. | |
| 2009/0198581 A1 | 8/2009 | Lidestri | |
| 2009/0216683 A1 | 8/2009 | Gutierrez | |
| 2009/0240597 A1 | 9/2009 | Oswald | |
| 2009/0265257 A1 | 10/2009 | Klinger et al. | |
| 2009/0271250 A1 * | 10/2009 | Sriver | G06Q 30/0241 705/14.4 |
| 2009/0271289 A1 | 10/2009 | Klinger et al. | |
| 2009/0281944 A1 | 11/2009 | Shakkarwar | |
| 2009/0287581 A1 | 11/2009 | Sriver et al. | |
| 2009/0292927 A1 | 11/2009 | Wenzel et al. | |
| 2010/0010902 A1 | 1/2010 | Casey | |
| 2010/0042487 A1 | 2/2010 | Barazani | |
| 2010/0042931 A1 | 2/2010 | Dixon et al. | |
| 2010/0057552 A1 | 3/2010 | O'Leary et al. | |
| 2010/0114739 A1 | 5/2010 | Johnston | |
| 2010/0246827 A1 | 9/2010 | Lauter et al. | |
| 2010/0262544 A1 | 10/2010 | Levchin et al. | |
| 2011/0022484 A1 | 1/2011 | Smith et al. | |
| 2011/0087530 A1 | 4/2011 | Fordyce | |
| 2011/0184863 A1 | 7/2011 | Coleman et al. | |
| 2011/0191173 A1 | 8/2011 | Blackhurst et al. | |
| 2011/0270909 A1 | 11/2011 | Fu | |
| 2011/0277016 A1 | 11/2011 | Hockings et al. | |

(56) References Cited

U.S. PATENT DOCUMENTS

| | | |
|---|---|---|
| 2011/0302412 A1 | 12/2011 | Deng et al. |
| 2012/0054625 A1 | 3/2012 | Pugh et al. |
| 2012/0066090 A1 | 3/2012 | Gangapurkar |
| 2012/0089481 A1 | 4/2012 | Iozzia |
| 2012/0096534 A1 | 4/2012 | Boulos et al. |
| 2012/0136754 A1 | 5/2012 | Underwood |
| 2012/0159635 A1 | 6/2012 | He et al. |
| 2012/0191567 A1 | 7/2012 | Williams et al. |
| 2012/0239531 A1 | 9/2012 | McCann |
| 2012/0253989 A1 | 10/2012 | Otruba et al. |
| 2012/0254720 A1 | 10/2012 | Hamm et al. |
| 2012/0278151 A1 | 11/2012 | Galit |
| 2013/0046628 A1 | 2/2013 | Bennett et al. |
| 2013/0179345 A1 | 7/2013 | Bui |
| 2013/0290127 A1 | 10/2013 | Finseth |
| 2018/0025397 A1 | 1/2018 | Kuruvila |

OTHER PUBLICATIONS

Bui, U.S. Appl. No. 09/457,839, Now U.S. Pat. No. 7,966,259, filed Dec. 9, 1999, System and Methods for Facilitating Transactions on, and Personalizing Web Pages of, Third Party Web Sites.

Bui, U.S. Appl. No. 12/357,211, Now U.S. Pat. No. 7,877,299, filed Jan. 21, 2009, Payment Service Capable of Being Invoked From Merchant Sites.

Bui, U.S. Appl. No. 13/006,171 Now U.S. Pat. No. 8,160,935, filed Jan. 13, 2011, Payment Service Capable of Being Integrated With Merchant Sites.

Bui, U.S. Appl. No. 13/436,440 Now U.S. Pat. No. 8,355,959, filed Mar. 30, 2012, Payment Service Capable of Being Integrated With Merchant Sites.

Bui, U.S. Appl. No. 13/717,547 Now U.S. Pat. No. 8,626,665, filed Dec. 17, 2012, Payment Service Capable of Being Integrated With Merchant Sites.

Bui, U.S. Appl. No. 14/135,134 Now Pub. 2015/0206215, filed Dec. 19, 2013, Payment Service Capable of Being Integrated With Merchant Sites.

Agrawal, et al., U.S. Appl. No. 12/265,523, filed Nov. 5, 2008, Hosted Payment Service System and Method.

Kuruvila, U.S. Appl. No. 12/236,285, filed Sep. 23, 2008, Widget-Based Integration of Payment Gateway Functionality Into Transactional Sites.

Agrawal, et al., U.S. Appl. No. 12/265,554, filed Nov. 5, 2008, Hosted Payment Service System and Method.

Ali, et al., U.S. Appl. No. 12/847,515, filed Jul. 30, 2010, Multi-Source Content Distribution With Authentication.

Murti, et al., U.S. Appl. No. 13/094,774, filed Apr. 26, 2011, In-Line Payment Processing From Interactive Applications.

Hu, et al., U.S. Appl. No. 13/098,160, filed Apr. 29, 2011, Transaction Processing and Support for Physical-Presence Merchants.

O'Reilley, et al., U.S. Appl. No. 13/356,460, filed Jan. 23, 2012, Third Party Data Integration for Checkout.

"HTML." Microsoft Computer Dictionary, 5th Ed. 2002, p. 258-259 (4 pages).

U.S. Appl. No. 12/265,523, filed Nov. 5, 2008, Agrawal, et al.
U.S. Appl. No. 12/236,285, filed Sep. 23, 2008, Kuruvila.
U.S. Appl. No. 12/265,554, filed Nov. 5, 2008, Agrawal, et al.

Adabala, et al., "Single Sign-On in In-Vigo: Role-based Access via Delegation Mechanisms Using Short-lived User Identities", Proceedings of the 18th International Parallel and Distributed Processing Symposium (IPDPS'04), IEEE, 2004, 8 pages.

Amazon.com, About 1-click and Gift-Click Ordering, Printed from www.amazon.com on Dec. 9, 1999.

Borenstein et al., "Perils and Pitfalls of Practical Cybercommerce," Jun. 1996, pp. 36-44, vol. 39, No. 6.

Cox et al., "NetBill Security and Transation Protocol," Proceedings of the First USENIX Workshop on Electronic Commerce, Jul. 1995.

"Cybercash Unveils "Instabuy.com" Web Site for Consumer One-Click Shopping Online," InstaBuy Press Release, Feb. 22, 1999, Printed from www.instabuy.com on Sep. 2, 1999.

Digital Wallets Project Home Page: http://www.db.stanford.edu/~daswani/wallets/, printed on Sep. 2, 1999.

Foster, Chuck; U.S. Appl. No. 60/162,651, filed Nov. 1, 1999.

Guglielmo, "A Tale of Two One-Click Initiatives," Printed from www.zdnet.com on Sep. 2, 1999.

"The InstaBuyTM Consumer Experience," PDF document downloaded from www.instabuy.com on Sep. 2, 1999.

"InstaBuySM From Cybercash Offers Easy and Safe Buying Solution to Online Consumers and Merchants," InstaBuy Press Release Aug. 19, 1998, Printed from www.instabuy.com on Sep. 2, 1999.

InstaBuy Merchant FAQ, Printout of web page http://www.instabuy.com/merchants/merch_faq.html, instabuy.com, 1999, pp. 1-4.

Kong, "Sharing Your Data Can Get You Discounts," Printed from San Jose Mercury News web site on Oct. 11, 1999.

Protocol of Discover, "Create Secure Online Account Numbers", obtained from http://www.discovercard.ca/customer-service/faq/soan.html on Oct. 17, 2011, 13 pages.

Qiang, et al., "The design and implementation of standards-based Grid single sign-on using federated identity", 12th IEEE International Conference on High Performance Computing and Communications, IEEE, 2010, pp. 458-464.

Smith, Ph.D., "Virtual Credit Cards Offer Safer Online Holiday Shopping", Credict Card Guide of Orbiscom, Jan. 2010, accessible from http://www.orbiscom.com/news143.html, 1 page.

"Understanding InstaBuy. A Consumer and Merchant Overview," PDF document downloaded from www.instabuy.com on Sep. 2, 1999.

Walker, "Digital Wallets," Printed from www.computerworld.com/home/features.nsf/all/990705qs on Sep. 2, 1999.

U.S. Appl. No. 12/265,523, Hosted Payment Service System and Method, filed Nov. 5, 2008.

U.S. Appl. No. 15/682,375, Widget-Based Integration of Payment Gateway Functionality Into Transactional Sites, filed Aug. 21, 2017.

U.S. Appl. No. 12/847,515, Multi-Source Content Distribution With Authentication, filed Jul. 30, 2010.

U.S. Appl. No. 13/098,160, Transaction Processing and Support for Physical-Presence Merchants, filed Apr. 29, 2011.

IMEI Third Generation Partnership; Technical Specification Group Services and System Aspects; International Mobile Station Equipment Identities, 2009.

* cited by examiner

HOSTED PAYMENT SERVICE SYSTEM AND METHOD

CROSS-REFERENCE TO RELATED APPLICATIONS

This application is a continuation of U.S. application Ser. No. 12/265,554, filed Nov. 5, 2008 which claims the benefit of priority from U.S. Provisional Application No. 61/082,813, filed Jul. 22, 2008, which is incorporated in its entirety by reference herein.

BACKGROUND

Description of the Related Technology

Consumers routinely shop for and purchase products and services from merchant web sites. Typically, the customer adds one or more items to a shopping cart, and then enters a checkout pipeline of the merchant's site. During the checkout process, the customer typically specifies credit card and shipping information for completing the transaction. The merchant's system then uses the specified information to complete the payment transaction.

Some merchant sites allow or require customers to complete the checkout process using a payment service hosted by a third party payment service provider. When the customer opts to use such a payment service, the merchant site directs or redirects the user's browser to a separate web site operated by the payment service provider. The customer can then log into an existing account with the payment service provider, or can create a new account. After completing the transaction on the payment service provider's site, the customer can return to the merchant's site, if desired.

One benefit of such third party payment services is that they reduce or eliminate the need for the merchant to set up and maintain the infrastructure for collecting payments from Internet users. This benefit can be especially significant for small merchants that do not have the resources needed to set up payment processing systems. Another benefit is that consumers can use a single account with a single entity to make purchases from many different merchants and merchant sites. Thus, consumers need not set up accounts with, or disclose their payment information to, all of the merchants from which they make purchases.

BRIEF DESCRIPTION OF THE DRAWINGS

Specific embodiments will now be described with reference to the drawings, which are intended to illustrate and not limit the various features described herein.

DETAILED DESCRIPTION OF SPECIFIC EMBODIMENTS

Various embodiments of a hosted payment service are disclosed. In some embodiments, a merchant can enable customer use of the payment service by adding a line or sequence of widget code to a web page, such as a shopping cart page, of the merchant's site. Thereafter, a user who is registered with the payment service can invoke the payment service and complete a purchase transaction directly from the merchant site, without navigating or being redirected to a separate payment service site. For example, while viewing a shopping cart page, the user may be able to securely interact with the payment service and complete the purchase transaction via a transaction display object that is incorporated into the shopping cart page. The display of the transaction display object may be enabled by the widget software code added to the page by the merchant. Widget code may additionally or alternatively be added to other types of pages of the merchant site, such as product detail pages, among others, to enable transactions to be completed from such pages.

In some embodiments, the transaction display object prompts the registered customer to enter a secondary authentication input, such as a personal identification number (PIN) or secondary password. The payment service may use this secondary input in combination with a browser cookie to authenticate the customer before completing the transaction. The secondary authentication input may be distinct from the customer's primary authentication information (e.g., username and password) used to log into the customer's payment service account, such that a fraudulent user who obtains it does not obtain log-in access to the customer's account.

Several different computer-implemented processes will now be described for providing a hosted payment service. These processes may be embodied individually or in any combination in a computer system or network of computer systems that implements a hosted payment service.

Figure 1:
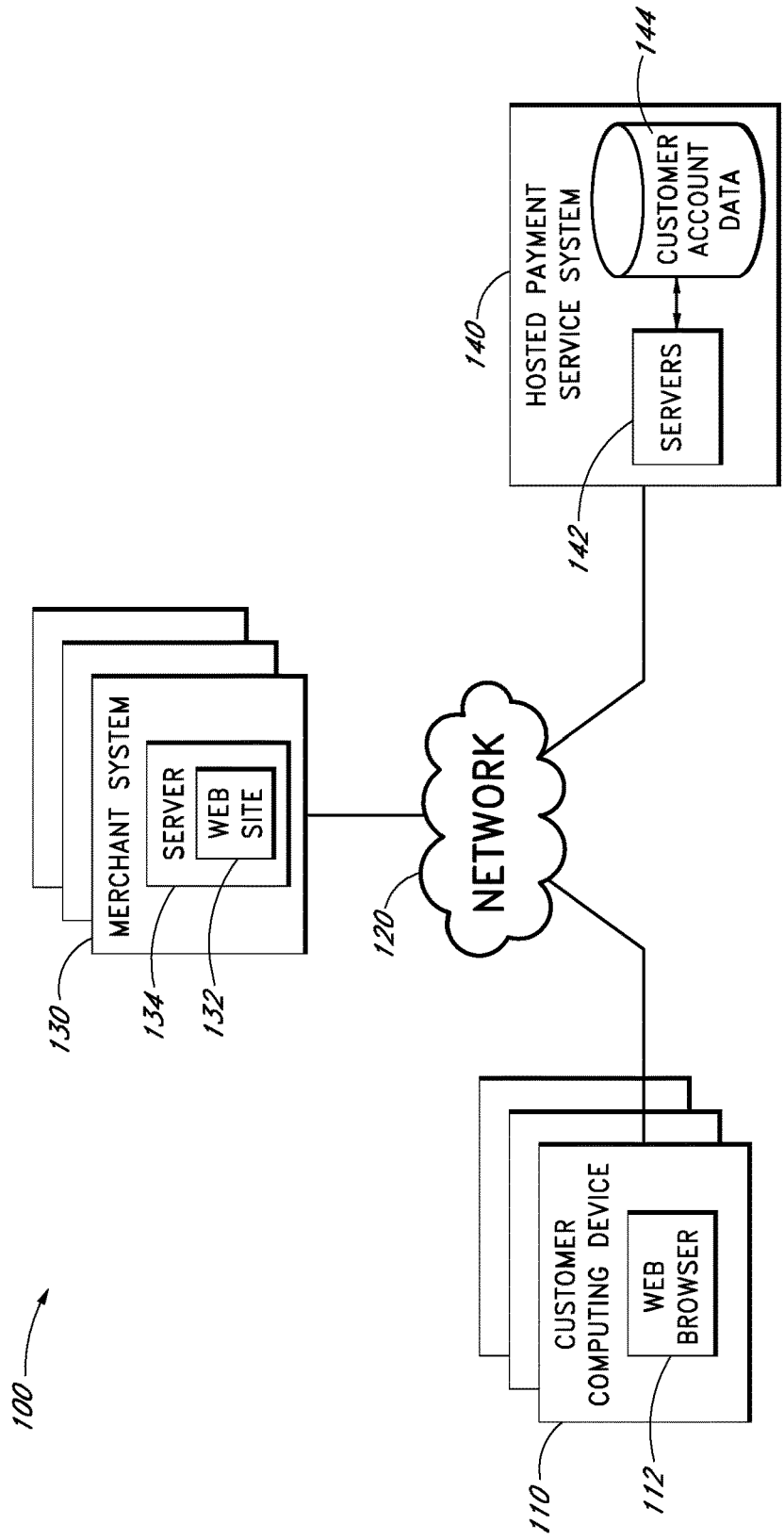
FIG. 1 illustrates a hosted payment service that can be invoked to complete purchase transactions from merchant sites according to one embodiment of the invention.

FIG. 1 illustrates a hosted payment service system 140, a merchant system 130 and a customer computing device 110 interconnected by a network 120 according to one embodiment of the invention. The network 120 can be the Internet or some other communications network, for example. The customer can be any entity or individual interested in purchasing products or services from the merchant. The terms "customer" and "user" are used interchangeably herein, and are not to be interpreted as limiting. The merchant can be any individual or entity that sells products or services from a merchant web site 132, which can be implemented using one or more servers 134. The customer selects and purchases products or services using a web browser 112 running on the computing device 110. As illustrated by FIG. 1, there may be more than one customer and associated customer computing device 110 and more than one merchant and associated merchant system 130. The merchant system 130 can include server software which runs on the server 134 such as, for example, web server software which sends out web pages in response to HTTP requests from remote web browsers such as the web browser 112 of the user. In certain embodiments, the merchant system 130 does not require any executable components associated with the hosted payment service.

The hosted payment service system 140 includes one or more servers 142, such as, for example, web servers. The servers are in communication with an account database 144 which stores information relating to customer accounts, merchant accounts, or both. The hosted payment service processes payments from customers associated with purchases from merchants in an efficient and user friendly manner. For example, the hosted payment service can process payments from the customer without having to re-direct the customer from the web site 132 of the merchant to a web site of the hosted payment service.

In certain embodiments, the hosted payment service system 140 generates a code segment adapted to be added to web page coding of a merchant web site 132 of the merchant. The hosted payment service system 140 then communicates the code segment to the merchant over the network 120. The code segment or "widget code" can be configured to add a first control that enables users to invoke the hosted payment service from the merchant web site 132 to purchase items. The first control may be, for example, a checkout button (see 230 in FIG. 2A, discussed below) which indicates to the user that actuation of the button will allow the user to pay using the hosted payment service. The code segment can consist of a single line of code or can include multiple lines of code.

A user may have an account with the hosted payment service 140. The payment service 140 may store information on the database 144 associated with the customer account such as, for example, customer name, credit card information, billing address information, log-in information, etc.

A server 142 of the hosted payment service system 140 can receive a request from the computing device 112 of a customer user who is registered with the hosted payment service. The request can be generated in response to user selection of the first control as displayed on a web page of the merchant web site. For example, where the first control is a button displayed on the web page of the merchant through the web browser 112 of the customer, the user may click on the button indicating their desire to pay using the payment service. The request can include transaction information for performing a purchase transaction in which payment is collected by the payment service on behalf of the merchant. The transaction information can include any information relating to the transaction. For example, the transaction information can include price information, information relating to the items to be purchased, or both.

The payment service 140 responds to the request by generating and returning web page coding that causes a transaction display object to be displayed on the user computing device within the merchant web page. For example, the web page coding may be communicated over the network 120 to the merchant 130. The transaction display object of certain embodiments includes at least some of the transaction information. For example, the transaction display object may display the item or items that the customer is purchasing, the shipping costs or the sales tax for the purchase. In some embodiments, the transaction display object displays a user identifier, such as the name or username of the customer.

The customer's browser thus loads the transaction display object coding from a source (namely the payment service 140) that is separate from the source 130 of the base component (e.g., HTML document) of the merchant web page. Although retrieved from separate sources, the transaction display object in some embodiments becomes part of, and is displayed in the same browser window as, the merchant web page. As discussed below, this may be accomplished using an iFrame html element and/or using an overlay display object.

The transaction display object can include a second control that is selectable by the user such that the user can complete the purchase transaction without navigating away from the web page. For example, the user may not be re-directed to another web page, such as the web page of the payment service, in order to complete the purchase transaction. In certain embodiments, for example, the user can complete the transaction using the payment service by interacting with a single web browser window displaying a single web page of the merchant site. As discussed herein, the web page of the merchant may include display elements, such as, for example, overlay display objects (which may also be referred to as "pop-overs") which become visible to the user during the purchasing process. The web page of the merchant may include a nested portion which can be served by a server of the payment service, as discussed herein.

The second control may include one or more buttons which the user can click to complete the purchase transaction, for example. Embodiments of the first control, the second control and the transaction display object are described in greater detail herein, with respect to FIGS. 2 and 3, for example.

Although described with respect to the embodiment of FIG. 1, those of skill in the art will recognize a variety of alternative configurations are possible. For example, in certain embodiments, the payment service 140 communicates with the merchant 130 over a network that is separate from the network used between the merchant 130 and the customer computing device 112.

Figure 2A:
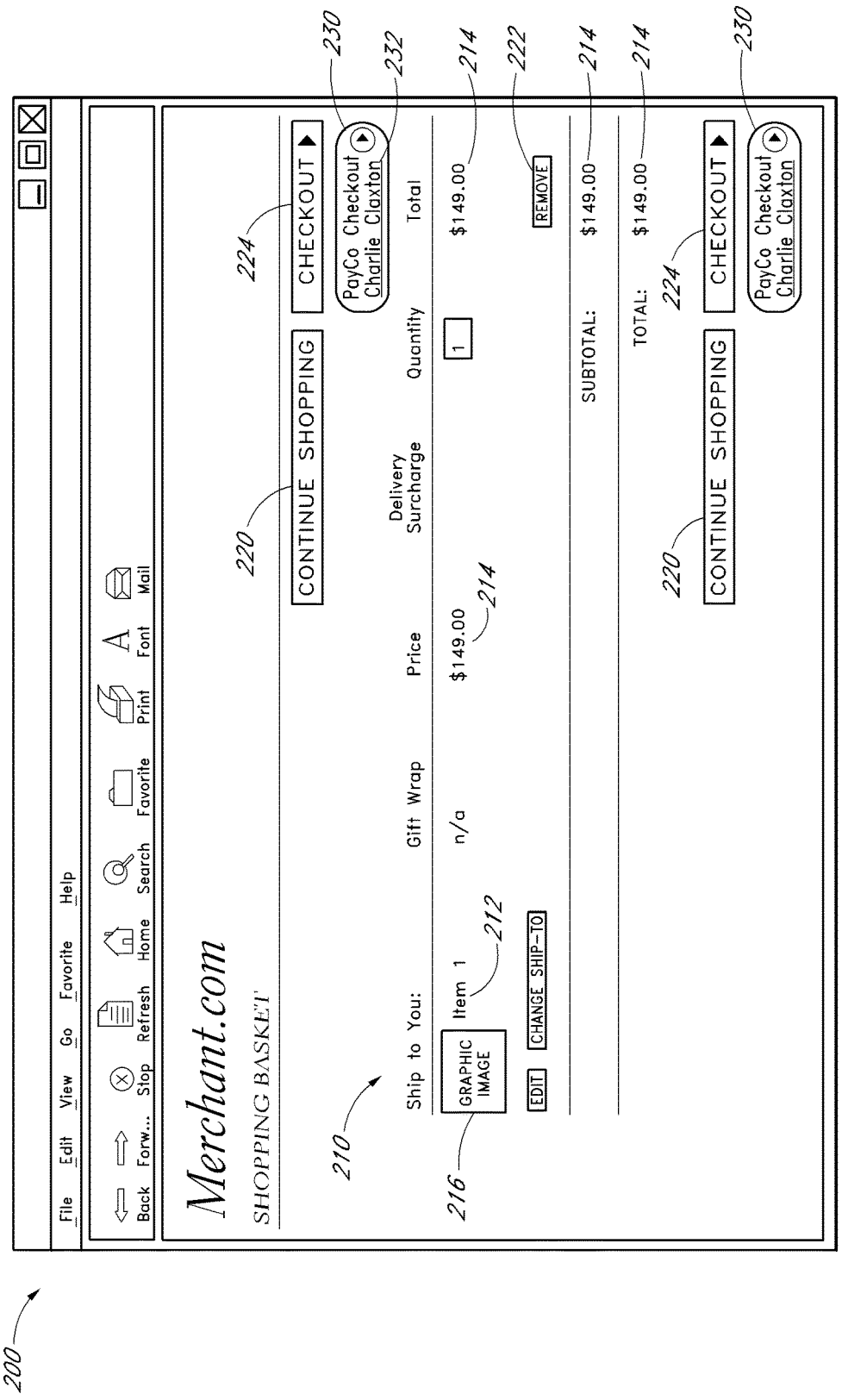
FIGS. 2A-2H illustrate graphical user interfaces showing some of the ways payment transactions can be completed using the hosted payment service.

FIGS. 2A-2H illustrate an example sequence of screen displays 200-207 that may be presented as a customer makes a purchase using an embodiment of a payment service 140. FIG. 2A illustrates a screen display 200 of a merchant web page in which the user has selected one item 212 for purchase from an example merchant web site, Merchant.com (e.g. Merchant.com may have a URL such as http://www.Merchant.com/). Various icons and information associated with the purchase are also displayed including the name of the item 212, the price 214, a graphical image of the item 216, and the item quantity 218.

Various control features may also be included on the merchant web page. For example, the button 220 allows a user to continue shopping and select more items to add to the shopping basket and the button 222 allows a user to remove one or more items from their shopping basket 210. Button 224 allows the user to proceed with checkout without using the hosted payment service system 140. For example, the button 224 may allow the user to checkout using a different payment service, or using the merchant's own payment process (if any).

A first control 230 allows the user to invoke the payment service from the merchant web site to purchase the items 212 in the shopping basket 210. When the user selects this control 230, a request is received by the payment service 140. The payment service 140 determines whether the user is a recognized user. For example, a user may be recognized if the user has an account and a currently valid browser session with the payment service. The payment service may determine whether the user is recognized by processing a user authentication object received from the computing device 110 of the user. The user authentication object can be based on a first authentication input.

In certain embodiments, the user authentication object may include a parcel of text such as, for example, an "HTTP cookie" (which can also referred to as a "Web cookie") and the first authentication input may include login information input by a user into a web site of the payment service 140. A user may have a valid session, for example, if the user has previously logged into the payment service using the same computer and browser (e.g., with a valid user name and password). The valid session can be detected through the use of a cookie. For example, a server of the payment service can cause a cookie to be sent to the customer's web browser 112. The cookie can then be sent back unchanged to the server by the customer's web browser each time the web browser accesses the server. In this way, the cookie allows the payment service to authenticate users, recognize users, or both.

Although described with respect to the embodiment of FIG. 2A, those of skill in the art will recognize a variety of alternative configurations from the disclosure provided herein. For example, in certain embodiments, there is no checkout button 224 and the user can only checkout using the payment service 140. As another example, the first control 230 may be displayed as an overlay display object.

In certain embodiments, a different authentication object may be used. For example, the payment service may send the first authentication object (e.g., a cookie) to the user's browser 112 even if the user does not input a first authentication input (e.g., a user name and password). In other embodiments, the first authentication input includes only a username and not a password. The authentication object may include multiple cookies and the cookies may be served by multiple servers of the payment service 140.

As indicated by the user's name icon 232 displayed on the first control 230, the payment service has recognized the user, who is named "Charlie Claxton" in the illustrated example, according to one of the recognition processes described herein. In this example, the user has also previously enabled "express checkout" and has previously input the one or more pre-defined default account settings. When the recognized user requests to pay using the payment service by clicking on the first control 230, the payment service responds to the request by generating and returning web page coding that causes a transaction display object 260 to be displayed on the user computing device 110 within the merchant shopping basket page, as illustrated by the example screen display 201 of FIG. 2B.

The transaction display object 260 can be defined by web page coding that is embedded in the web page coding of the shopping cart page and may sometimes be referred to as a widget. In some embodiments, the web page coding may be embedded in another page of the merchant, such as, for example, a product detail page. The widget code may be downloaded from the merchant web site and enable the browser to load the transaction display object 260 from the hosted payment service, for example. The transaction display object 260 may be generated by widget code, such as JavaScript code, that is downloaded and executed by the web browser 112 of the customer. According to some embodiments, the widget code may be written in a different programming language, such as DHTML, Adobe Flash, or various scripting languages.

In some embodiments, the web page coding is generated and returned based at least in part on the processing of the user authentication object. For example, as illustrated by FIGS. 2G and 2H, the web page coding may not cause a transaction display object 260 to be displayed if the user is unrecognized; in this scenario, the user's browser may be re-directed to a web page of the payment service (e.g. http://www.payco.com/) for authentication, as described below.

Figure 2B:
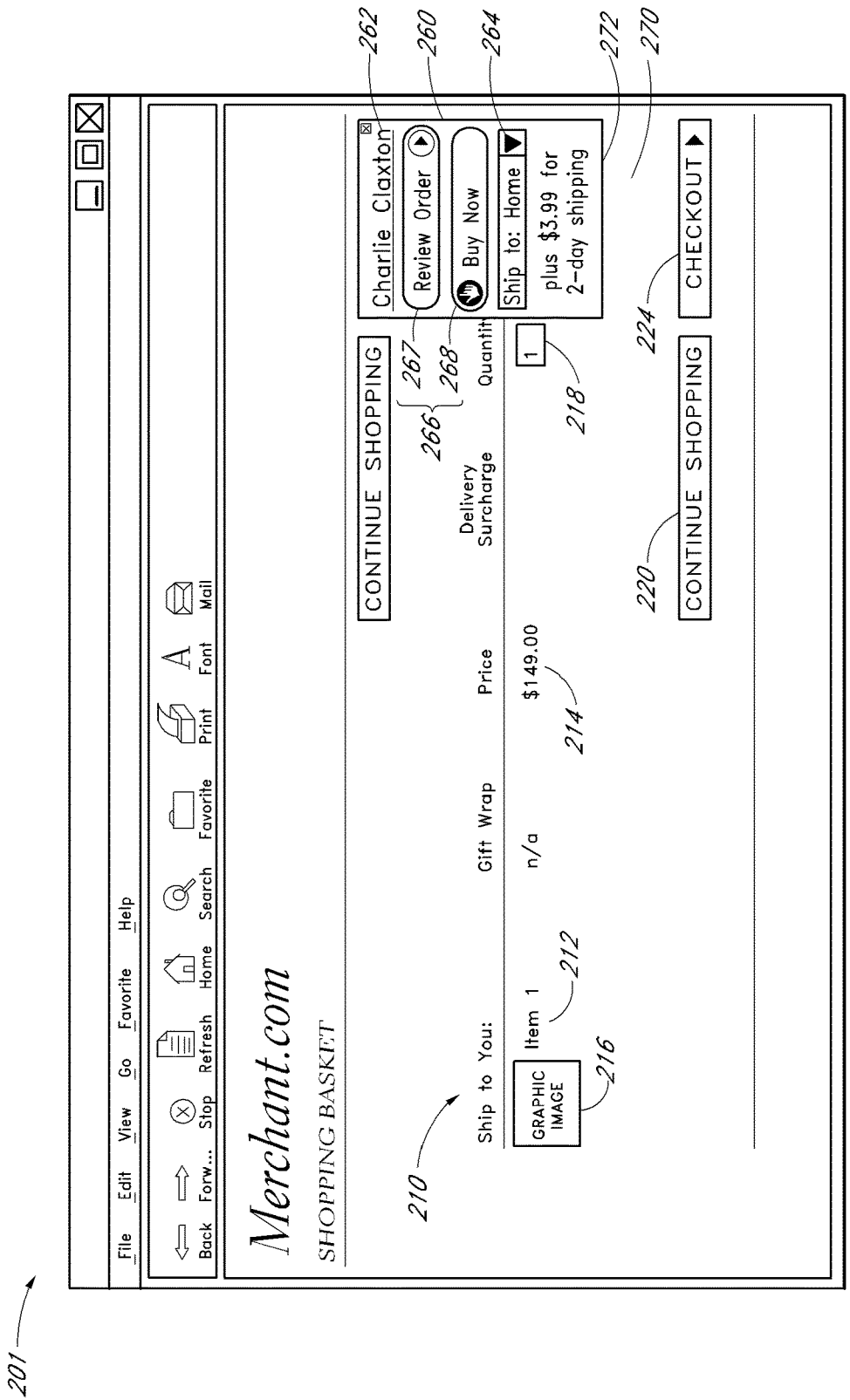

With further reference to FIG. 2B, the transaction display object 260 of certain embodiments includes at least some of the transaction information. For example, the transaction display object 260 may include checkout information. In the illustrated embodiment, the transaction display object 260 displays the name of the user 262 and a label (e.g., "home") corresponding to a previously-specified shipping address. A drop-down menu 264 enables the user to select a different pre-specified shipping address. In other embodiments, the transaction display object 260 may display the item or items that the customer is purchasing and the price of the items, method of payment information, pricing information, some other type of information related to the transaction, or a combination thereof. In other embodiments, no information related to the transaction is included in the transaction display object.

As illustrated by FIG. 2B, the transaction display object 260 can be at least partially displayed within an overlay display object, which may also be referred to as a "web pop-over." The overlay display object allows the transaction display object 260 of the payment service to be displayed within the merchant web page without interfering with or displacing the layout of the merchant web page. (As discussed below, the size and content of the overlay display object 260 may be updated dynamically during the course of the transaction.) In this manner, the transaction display object 260 does not have to be incorporated into the layout of the merchant web site, but is still viewable to the user and the user does not have to be redirected to another web page or site. For these and other reasons, using the overlay display object can potentially help the merchant maintain a fluid design flow and user experience while decreasing cost and complexity. In the illustrated embodiments, the overlay display object 260 becomes part of the merchant web page, and is therefore displayed without opening a new browser window. This is in contrast to pop-up windows, which are displayed in a separate browser window and are not part of the original web page. This characteristic of the overlay display object can provide a better user experience, and also avoids the intervention of pop-up blocker software.

The transaction display object 260 can include one or more buttons 267, 268 selectable by the user such that the user can complete the purchase transaction using the payment service without navigating away from the merchant web page. In addition, the one or more buttons 267, 268 may allow the user to complete the purchase transaction using the payment service without having to enter login information, purchase information, or both, because they are a recognized user.

At the checkout stage depicted by FIG. 2B, the transaction display object 260 displays a "review order" button 267 and a "buy now" button 268. The "review order" button 267 allows the recognized user to complete the transaction using a "quick checkout" process described below. The "review order" button 267 causes checkout confirmation information to be displayed within the transaction display object 260 before the user completes the purchase transaction. Selecting the "buy now" button 268 allows the user to immediately checkout using the payment service without further review. In this case, the user has previously set up preferences with the payment service 140, such as payment methods to be used and one or more of the pre-specified shipping address mentioned above. These preferences can then be used to complete the checkout process when the user selects the "buy now" button.

Figure 2C:
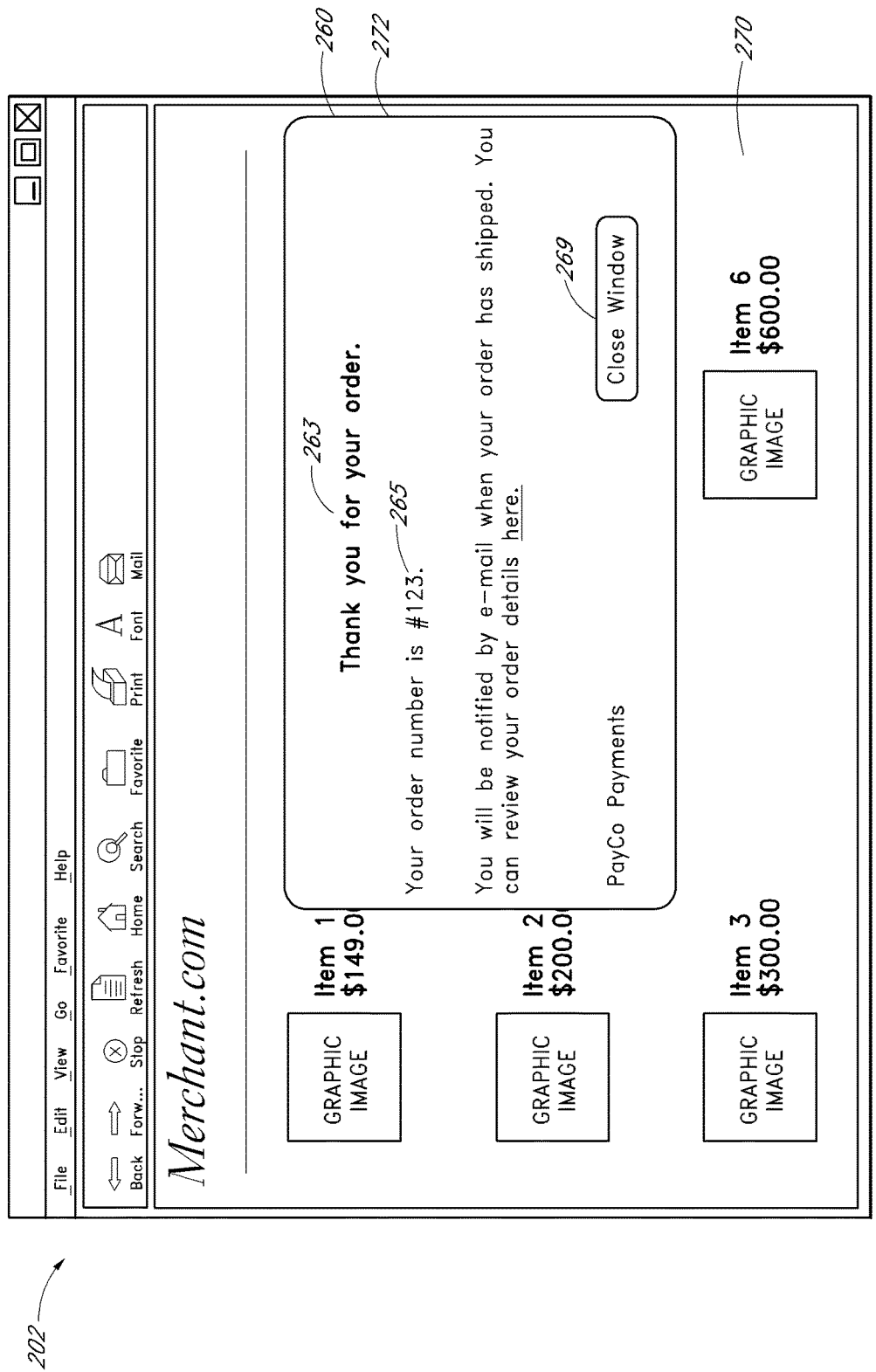

FIG. 2C illustrates an example screen display 202 presented to a user after they click on the instant checkout button 268. The transaction display object 260 is updated to include post-checkout information such as a thank you message 263 and an order confirmation number 265. A "close window" button 269 can be included which allows the user to close the transaction display object 260 and continue shopping on the merchant web page or, alternatively, be directed to some other web page of the merchant web site or to some other web site. In other embodiments, the thank you message is not part of the transaction display object 260 and may be served by the web site of the merchant instead of by the payment service.

Figure 2D:
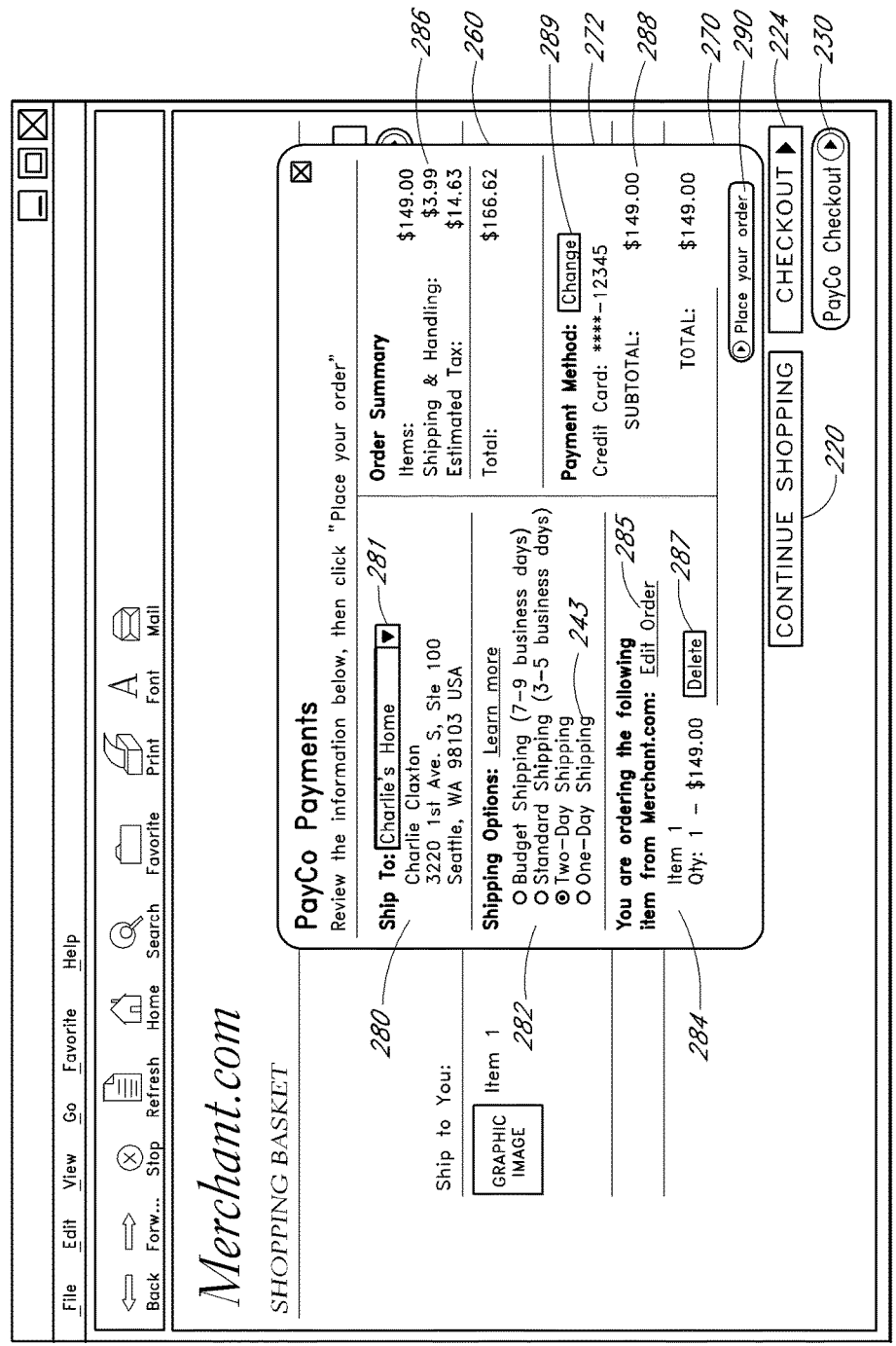

Referring again to FIG. 2B, the "review order" button 267 allows the user to complete the transaction using the payment service without navigating away from the merchant web page such that the user can review details of the transaction and confirm that they would like to place the order. FIG. 2D illustrates an example screen display 203 presented to the user when the user selects the "review order" button 267. As shown, the display object 260 may expand on the page as needed to show the order details such that a portion of the original page is obstructed from view. The transaction display object 260 is updated to include transaction detail information such as the current selected shipping address 280, current selected shipping option 282, price summary information 284, the current selected payment method 286, and item information 288. The user can change one or more transaction details using various controls which may be included on the updated transaction display object 260. For example, the user can select a different shipping address using the drop-down menu 281, change the shipping option using the menu 283, edit their order using the link 285, delete the item from their cart using the button 287 or change their method of payment using the button 289. The confirmation button 290 allows the user to place their order after reviewing and/or editing the transaction details.

In other embodiments, the control mechanisms for each transaction detail may be different. For example, a drop-down menu may be used instead of the bubble-type menu 283 to change the shipping option details 282. In various embodiments, one or more additional transaction details are displayed on, or are controllable through, the transaction display object 260, or one or more of the transaction details displayed on or controllable in the embodiment of FIG. 2D are not displayed on or controllable through the transaction display object 260.

In certain cases, users may want to review the details related to the transaction and be able to make adjustments before their order is placed and payment is processed. Accordingly, users may benefit from using quick checkout method using the "review order" button 267 as illustrated by FIG. 2B and FIG. 2D. In some cases, users may want to process their order as relatively more quickly and may therefore benefit from using the instant checkout method using the button 268 as illustrated by FIG. 2B and FIG. 2C. In some embodiments, there is no "buy now" button 268 and the user can only check out using the "review order" button 267.

Figure 2E:
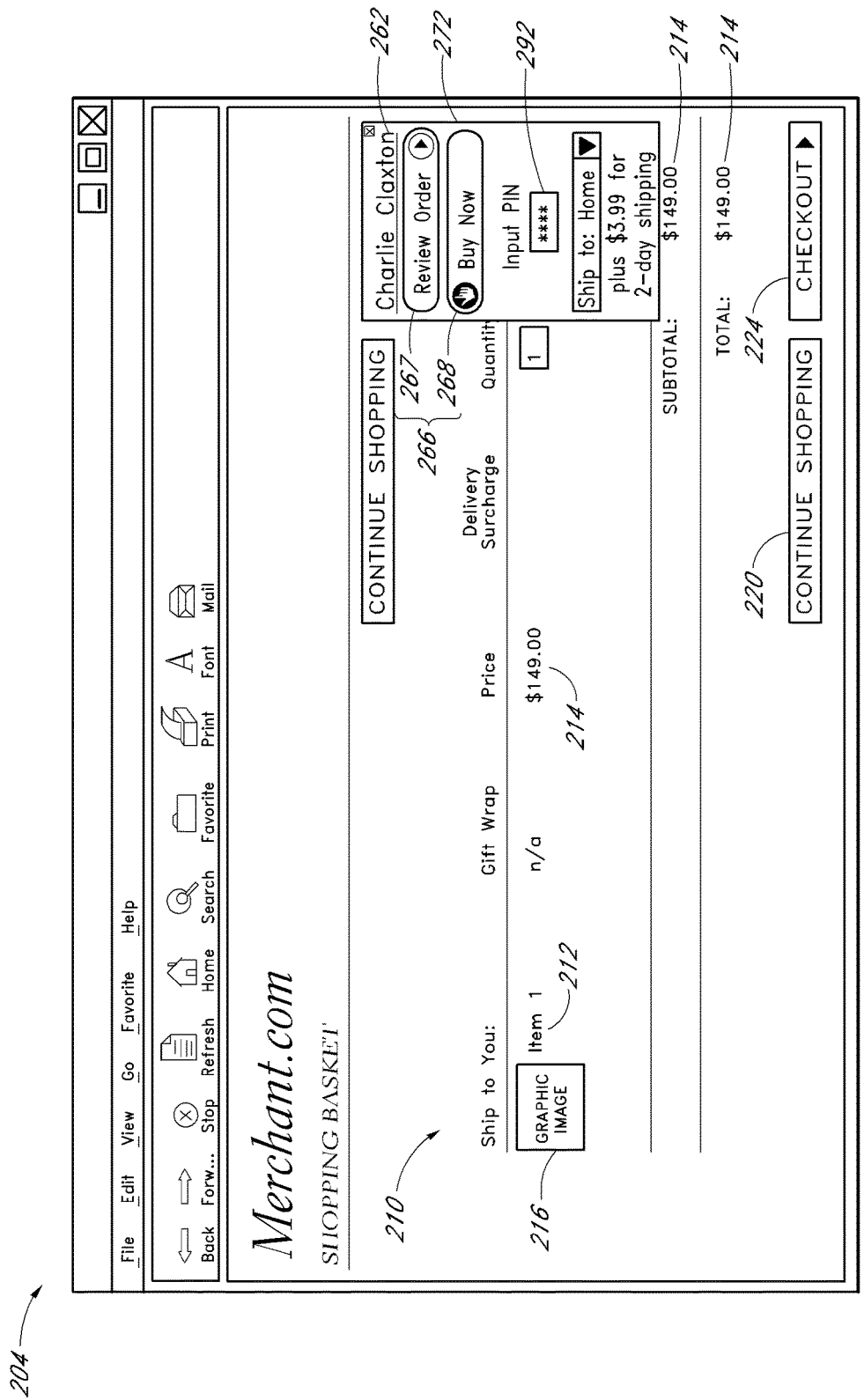

FIG. 2E illustrates a screen shot 204 of an embodiment in which the transaction display object 260 of FIG. 2B is augmented with a secondary authentication input field 292. The payment service can process a secondary authentication input which is input by the user into the transaction display object 260 such that whether the user can complete the electronic transaction using the one or more buttons 267, 268 is based at least in part on the processing of the secondary authentication input. The display of the secondary authentication input field 292 may be a merchant-configurable or customer-configurable option of the payment service. The secondary authentication input can be a string of characters associated with the user. For example, the secondary authentication input may be a personal identification number ("PIN"). For example, the payment service may receive the PIN of the user and confirm that it matches a pre-set PIN. The PIN may be configurable by the user such as, for example, through the payment service web site, or may be a pre-set PIN that is provided to the user by the payment service. In certain embodiments, the secondary authentication input is separate and distinct from the user's primary payment service authentication information (e.g., username and/or password). For example, the primary authentication information may provide log-in access to the user's account on a site hosted by a server of the payment service system, and the secondary authentication input may not provide log-in access to the account on the payment service site. For example, the user may be able to edit information associated with their account (e.g., credit card information, address information, etc.) when they log-in to the payment service site using their primary authentication information, but are unable to do so using the secondary authentication input. In some embodiments the secondary authentication input is a one-time password, such as those generated using a token generator or other computing device.

In certain embodiments, the secondary authentication input can be used for multiple checkout sessions without being reset. The secondary authentication input may be characterized as persistent, for example. Accordingly, the user can manage one secondary authentication input and will not be burdened with having to remember different secondary authentication inputs for different checkout sessions. The combination of the first authentication object and the secondary authentication input can provide security benefits to the user. For example, as described above the first authentication object, which may be a cookie, can be provided to a user after they login to the payment service providing a first authentication input. The first authentication object can be described as providing a first layer of security because purchases through the payment service can only be made from the browser that received the cookie. As such, even if a party had access to the secondary authentication input, they would not be able to make purchases unless they did so through the browser of the user which had access to the cookie.

The user may have one or more default shipping addresses associated with their payment service account. Moreover, in certain embodiments, the default shipping addresses and other information associated with the account (e.g., credit card information) is editable by a user only if they log in directly to the web site of the payment service. As such, even if an entity had access to both the browser of the user with the first authentication object (e.g., a cookie) and the secondary authentication input (e.g., a secondary PIN), the entity would only be able to ship items to the shipping addresses associated with the account. In certain cases, this may deter fraudulent purchases, providing another layer of security. For example, it may be difficult for the entity attempting to fraudulently purchase the item using the user's account to collect the item at the user-defined shipping addresses.

In addition, the secondary authentication input provides another layer of security because it can prevent fraudulent purchases by those who have access to the user's browser but do not know the user's secondary authentication input. For example, this may be useful where a computer is shared by multiple family members or employees. User's may be concerned that entering login information into a third-party web site may increase the risk of their login information being intercepted. As such, users may not want to enter their hosted payment service login information into the web page of the user. The secondary authentication input can address these concerns while providing additional security because the secondary authentication input is not associated with the user's payment service login information. Moreover, in certain embodiments the first authentication object (e.g., the cookie), the secondary authentication input (e.g., a secondary PIN), or both, are sent to the payment service via the nested portion of the merchant's web page (e.g., through the iFrame element) and are therefore not accessible to the merchant or other parties. This can, for example, prevent "simulated" fraudulent purchases by the merchant acting on behalf of the customer. Some embodiments may include other types of web coding which keep the first authentication object and/or the secondary authentication input from being exposed to and/or accessible to the merchant or other parties. For example, in one embodiment, Flash objects may be used instead of, or in addition to, iFrame elements. In other embodiments, the first authentication object, the secondary authentication input, or both, may not be sent through the nested portion of the web page and may be exposed to and/or accessible by the merchant. In one embodiment, for example, the customer does not input the secondary authentication object into the iFrame object directly and the merchant collects the secondary authentication input from the customer and passes it to the payment service (e.g., through the iFrame element).

Those of skill in the art will recognize from the disclosure herein that certain alternative configurations are possible for the secondary authentication input. For example, in certain embodiments, the secondary authentication input may be some other type of input such as a voice recognition input or biometric identification input (e.g., a fingerprint). In some embodiments, the secondary authentication input is reset before each login session by the payment service. For example, in one embodiment, the payment service 240 generates a unique secondary authentication each time the user attempts to use the payment service and sends the secondary authentication to the user (e.g., via an e-mail, or via a Short Message Service text message). In some embodiments, the secondary authentication input is associated with the user's payment service login information. For example, the secondary authentication input may include be the user's primary payment service username, but a different password.

The authentication processes described herein may be used in any situation in which authentication of a user of a hosted service is desired. For example, the hosted service may authenticate users who are existing subscribers to a service of a merchant. In one embodiment, for example, the merchant is a provider of video content or audio content, and the hosted service authenticates subscriber users so that they can view the video content or listen to the audio content on a web page of a merchant or another web page. In one embodiment, for example, a media widget that plays audio and/or video can be embedded in a web page which plays songs that are purchased by the user.

In certain embodiments, a user who has express checkout enabled and is a recognized user is re-directed to the web site of the payment service when they indicate that they would like to complete their transaction using the express checkout feature of the payment service (e.g., by selecting the first control 230). However, the user does not have to enter their log-in information in order to complete the purchase transaction. This may be the experience presented to a user who does not have a web browser capable of running embodiments of the web page coding described herein. For example, it may be the experience presented to a user who does not have a browser with JavaScript enabled when the web page coding includes JavaScript portions.

Referring again to FIG. 2B, the merchant web page can include a main portion 270 defined by a first document and a nested portion 272 defined by a second document. The second document can be served at least in part by a server of the payment service and the transaction display object 260 can be displayed at least in part within the nested portion 272. For example, the merchant web page may include a first HyperText Markup Language ("HTML") document which generally defines the structure, content, and format of the main portion 270 of the web page. The first HTML document can be served to the user's web browser from a server of the merchant web site 132. The merchant web page further includes a second HTML document which is embedded in the first HTML document and defines the structure and format of the nested portion 272 of the web page. For example, the first HTML document may include a reference to the second HTML document. The HTML element which allows the first HTML document to embed the second HTML document into the web page may be referred to as an "iFrame." The second HTML document is served at least in part by the payment service system.

Because the second document is served by the payment service instead of by the merchant web site, there may be a benefit of improved security. For example, the merchant web site will have no control over or access to the nested portion 272 of the merchant web page because it is defined by the second document which is being served by the payment service. As a result, the merchant web site can be prevented from possibly forging a transaction by simulating a selection (e.g., a click) of the one or more buttons 267, 268 and causing a purchase to be processed without the user actually selecting (e.g., clicking) on the one or more buttons 267, 268. Additionally, because the payment service has control over the nested portion and any data communicated through or under the control of the nested portion 272, it can be difficult for the merchant web site to access customer content such as the authentication object (e.g., a cookie) associated with the payment service site described above.

As will be recognized from the disclosure herein, alternative configurations are possible. For example, in some embodiments, the merchant web page is not divided into main and nested portions. For example, the merchant web page can be defined by a single HTML document. In certain embodiments, some other mechanism is used to divide the control of the merchant web page into multiple portions which provides similar security benefits. In some embodiments, the main portion 270, the nested portion 272, or both, are served by more than one HTML document. There may be more than one nested portion 272 in some embodiments. Some embodiments may include other types of web coding instead of, or in addition to, iFrame elements. For example, in one embodiment, Flash objects may be used.

Although described with respect to the illustrated embodiments, alternative configurations will be appreciated from the disclosure provided herein. For example, in some embodiments, the transaction display object 260 does not include an overlay display object. The transaction display object 260 may be integrated into the merchant web page. In other embodiments, the transaction display object 260 is displayed as a web pop-up which is not a part of the merchant web page but instead requires a new browser window to be opened to display the content of the transaction display object 260. A merchant may add the payment widget to other types of pages, such as a product detail page, such that a user could purchase a single item directly from the product's detail page. In certain embodiments, the post-checkout information may be presented in other ways. For example, in one embodiment, the post-checkout information is not part of the transaction display object 260, is presented to the user through the main portion 270 of the merchant web page, or both.

In various embodiments, there are different ways of checking out and different corresponding configurations for the one or more checkout buttons 266. For example, in one embodiment the user may be allowed to checkout using a process which requires the user to enter their payment service login information. There may be more than the two buttons 267, 268 in some embodiments which allow the user to checkout in more than two different ways. In some embodiments, there is only one method of checking out and one corresponding button. For example, in various embodiments, the user can only checkout using the "buy now" button 268 or, alternatively, only the "review order" button 267. In some embodiments, the user may be redirected to the website of the payment service. For example, in one embodiment, if the browser of the user is configured such that it does not accept third-party cookies, the browser may not accept the first authentication object (e.g., a cookie of the payment service) and the user may be redirected to the website of the payment service. For example, the user may be redirected to the website of the payment service after clicking on the checkout button 230 of FIG. 2A. The user may then complete the checkout at least in part from the website of the payment service. The checkout flow may be similar to that illustrated by FIGS. 2B-E except that it is executed on the website of the payment service rather than the website of the merchant. In addition, the user may be directed back to the merchant website after completing the transaction or at some other point during the checkout process.

Figure 2F:
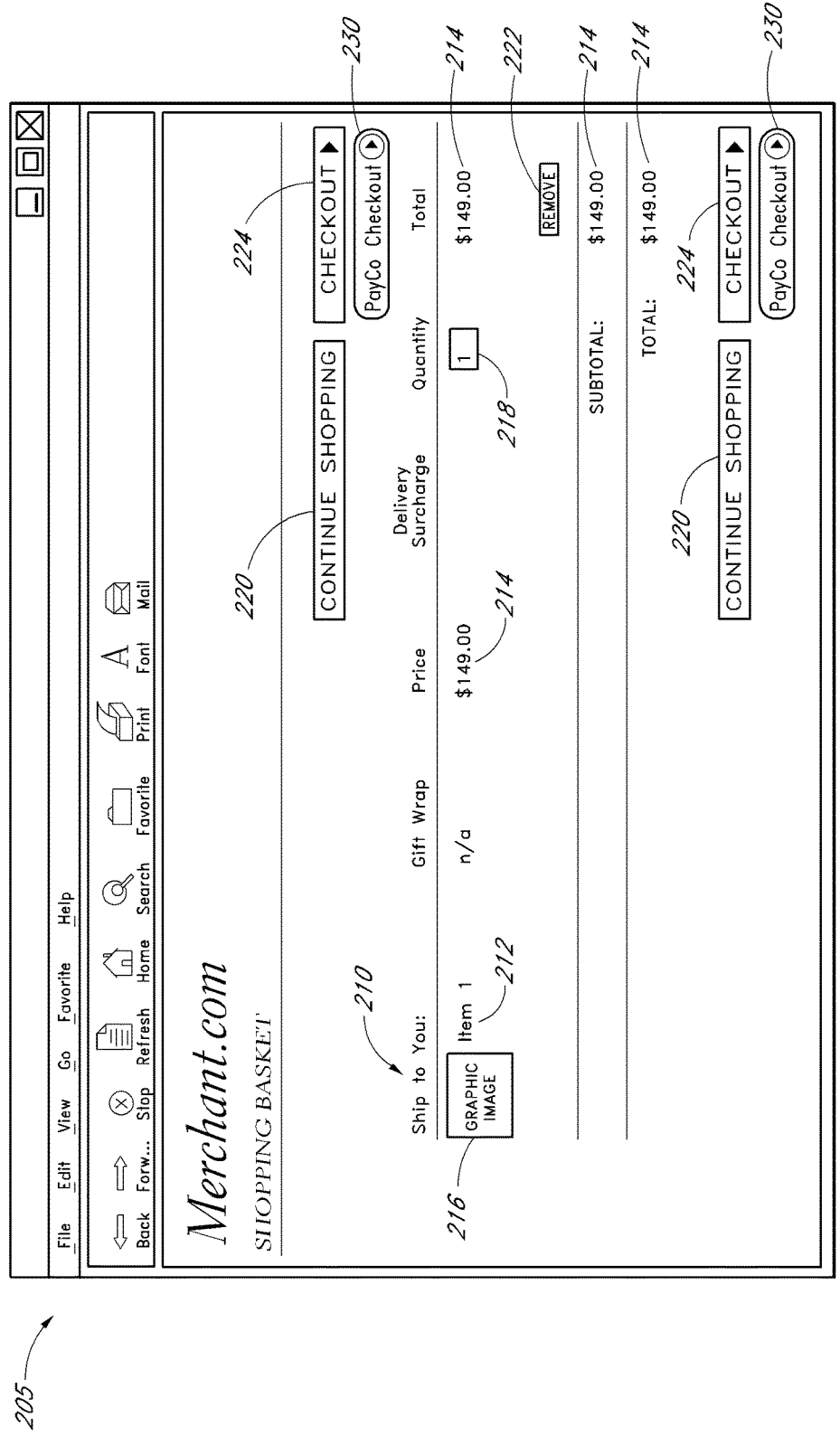
Figure 2G:
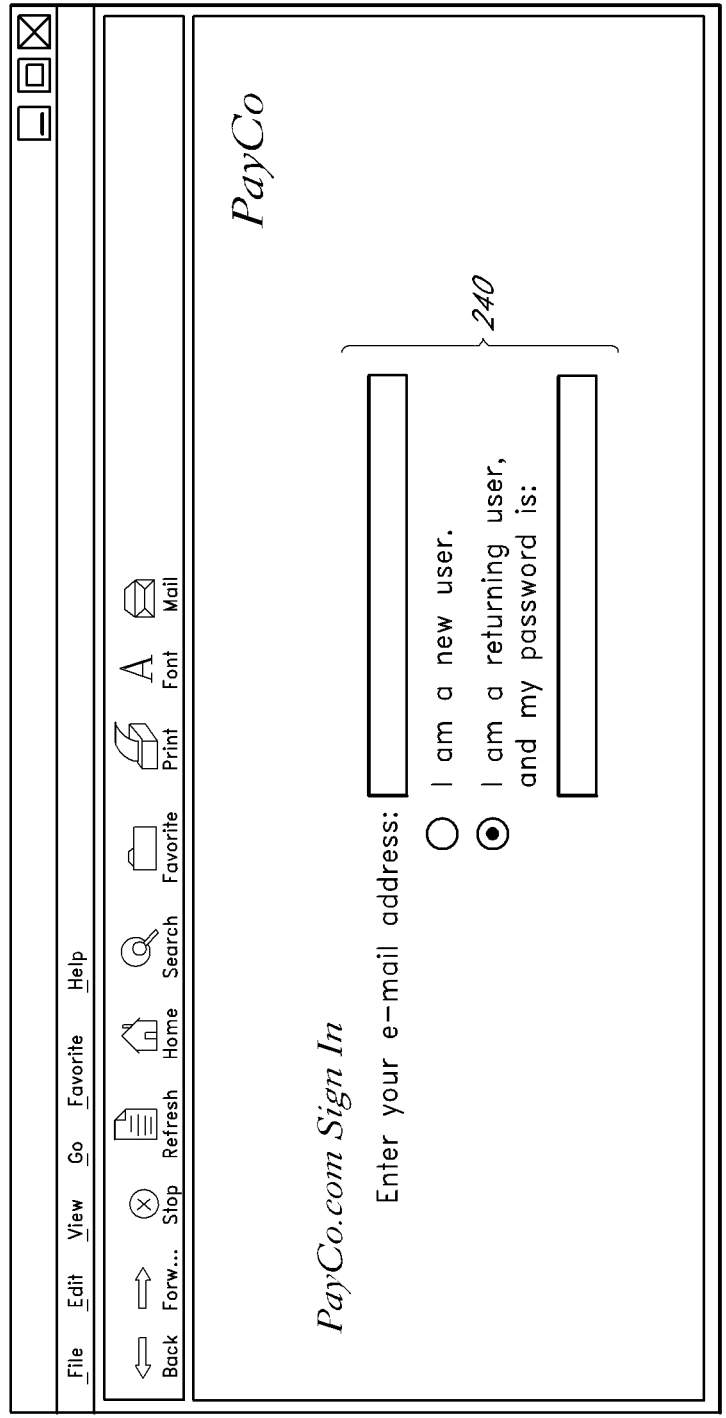
Figure 2H:
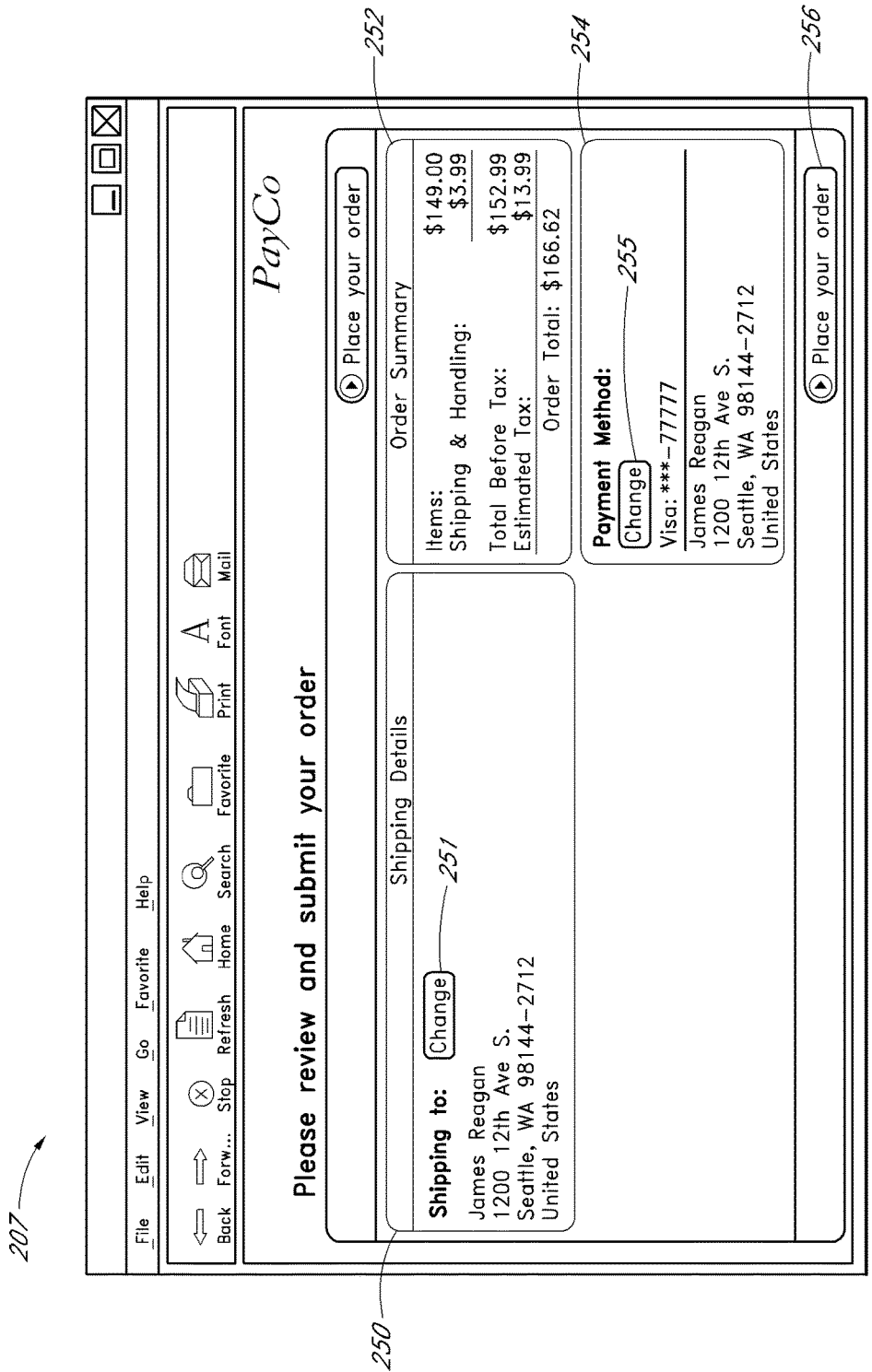

FIG. 2F illustrates a screen display 205 of a merchant web page in which the user has selected one item 212 for purchase and is not recognized. If the user is unrecognized, they may be directed to a web page of the payment service according to the example embodiment, as illustrated by the screen display 206 of FIG. 2G. The user may be prompted to either open an account if they do not have one already, or sign in to the payment service, using the interface 240, for example. Once signed in to the payment service, the user may review and submit the order using a web page of the payment provider, as illustrated by the screen display 207 of FIG. 2H. The user may have one or more pre-defined default account settings associated with their payment service account. For example, the user may have a default shipping address, shipping speed, and payment method defined for their account. In some embodiments, if the user has not previously set the one or more default account settings, the user will be prompted to do so before they can place their order (e.g., before the screen display 207 of FIG. 2H would be presented to them).

For example, the user can review their shipping details 250, order details 252, and payment details 254. A button 251 can allow the user to change their shipping information and a button 255 can allow the user to change their payment method. A button 256 can allow the user to place their order. Once the user has placed their order, the payment service will cause the user to be directed back to the merchant web site where an order summary or thank you page may be presented, such as the thank you page described above with respect to FIG. 2C. Alternatively, the user may be directed to a web page of the merchant where the user can continue shopping.

Once a registered user has logged in to the payment service (e.g., by using the interface illustrated in FIG. 2G), they will be recognized by the payment service on subsequent visits to the merchant's web page using the same web browser 112 on the same computer 110. For example, the user's browser will have received a cookie from the payment service and their authenticated session will be recognized. In some embodiments, the user does not have to have been directed to the log-in page (FIG. 2G) from the web site 132 of the merchant in order to create a valid session. For example, the user may directly navigate to the web site of the payment service 140 in order to create an authenticated session by logging in and receiving the cookie. Alternatively, the user may also have been directed to the payment service web site from a web site other than the merchant web site, such as from another merchant's web site, and subsequently login and receive the cookie. In certain embodiments, the cookie or other authentication object may expire after a certain period of time and the user may have to revalidate their session to be recognized.

As will be appreciated from the disclosure provided herein, in other embodiments, customer recognition may be performed in alternative configurations. For example, in one embodiment, some authentication mechanism other than a cookie is used. In one embodiment, a cookie is used to recognize the user but no login is required. In one embodiment, the user is not re-directed if they are unrecognized. For example, the user may be authenticated (e.g., login to the payment service and receive a cookie) without being redirected from the merchant web page. In one embodiment, the user may be authenticated by interacting with the nested portion 272 of the merchant web page.

In certain embodiments, the user will be prompted to decide whether they want to enable the checkout experience described herein in which the user can use the payment service without navigating away from the merchant web page (also referred to herein as "express checkout"). For example, in certain embodiments, if the user does not enable express checkout, they may continue to checkout using the process described above with respect to FIGS. 2F-2H instead of the express checkout method described herein.

Figure 3:
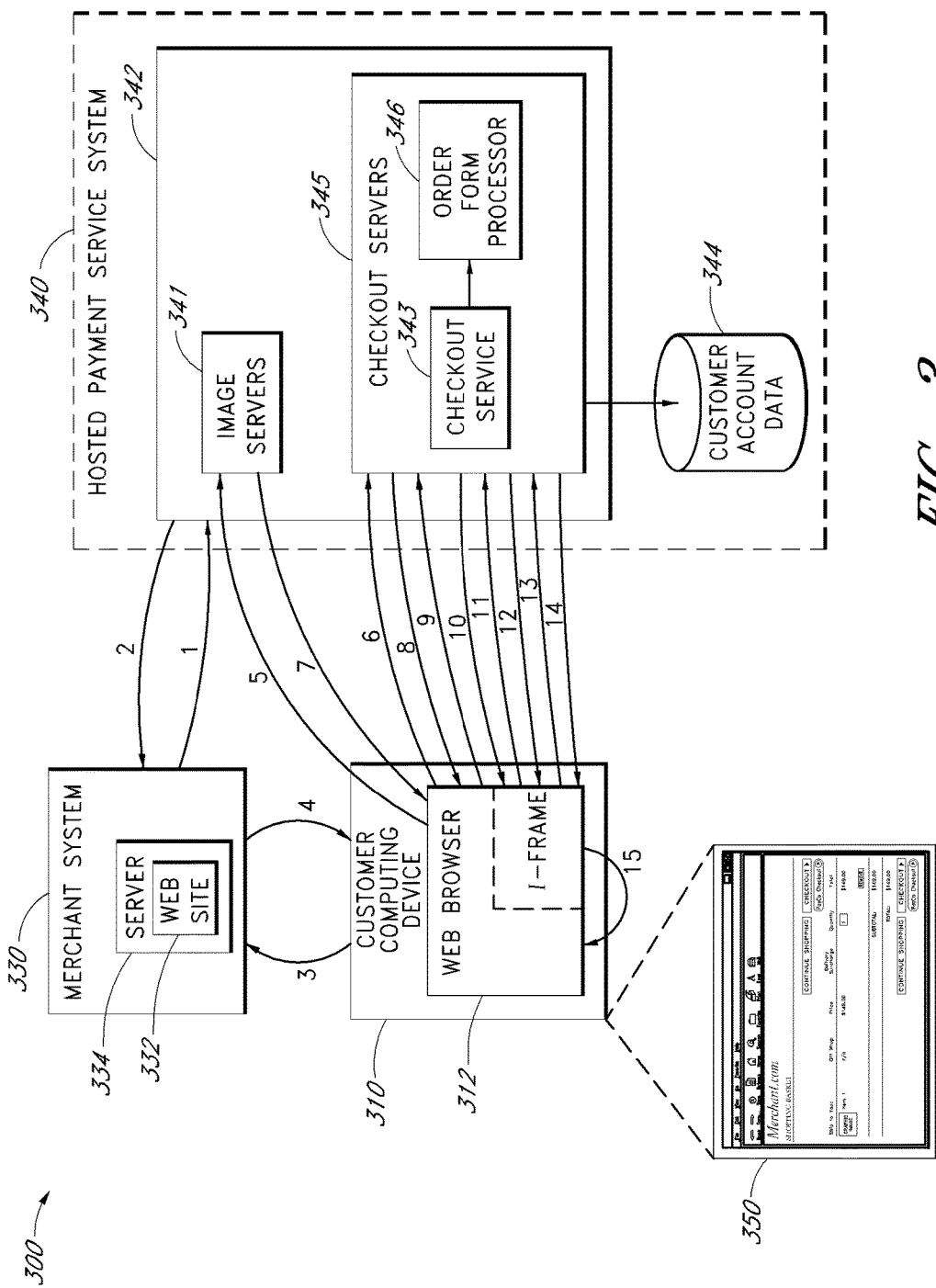
FIG. 3 illustrates a data flow diagram showing the transfer of information between a customer computing device, a hosted payment service provider, and a merchant system in accordance with certain embodiments described herein.

FIG. 3 illustrates an example data flow diagram 300 showing the transfer of information between a customer computing device 312, the hosted payment service system 340, and a merchant system 330 in accordance with certain embodiments. The embodiment of the transaction display object described by the data flow diagram 300 can be the transaction display object 260 described above with respect to FIG. 2, and includes a "review order" such as the "review order" button 267 described above. Moreover, for the purposes of illustration, the data flow diagram 300 assumes that a user is a recognized user. Information is sent between the components 312, 330, 340 over a communications network such as the Internet.

At event 1, the merchant 330 requests a code segment from a server of the payment service 340. For example, in one embodiment, the merchant may access a web site of the payment service 340 in which they can select a first control (e.g., the first control 230 including a checkout button, as described above with respect to FIG. 2) that they would like to include on their merchant web site so that customers may checkout using the payment service. At event 2, the payment service 340 generates a code segment adapted to be added to web page coding of the merchant web site and communicates the code segment (e.g., via a web page) to the merchant. The code segment can be configured to add the first control (e.g., a checkout button 230 as in FIG. 2A) that enables users to invoke the payment service from the merchant web site to purchase items. The code segment may be an HTML and/or JavaScript code segment, for example, and may include a unique identifier of the merchant or merchant site.

In certain embodiments, the process in which the code segment is obtained by the merchant may be different. For example, in certain embodiments, the merchant can be given a sample code segment which they can modify according to their preference and insert into their web page coding. In some embodiments, the merchant obtains a software program (e.g., from the payment service system) which they can install on merchant 330 and use to generate the code segment.

The user accesses the merchant web page 350 including the first control at event 3. The merchant 330 returns the requested merchant web page 350 at event 4 to customer computing device 310 of the user and the web page 350 is displayed in the web browser 312 running on the customer computing device 310. The web page 350 may be defined by an HTML document which includes one or more references related to a first control (e.g., a reference to an image file which graphically represents the first control), one or more references to coding of the payment service 340 (e.g., JavaScript code of the payment service provider 340), or both.

At events 5 and 6 of FIG. 3, the web browser 312 requests one or more pieces of information from the payment service 340. For example, at branch 5 the browser 312 may request information referenced in the web page 350 related to the first control (e.g., the image file which graphically represents the first control). The browser 312 may also request web page coding of the payment service 340 referenced by the web page 350 at branch 6 (e.g., the JavaScript code from the payment service 340).

The web page coding of certain embodiments includes a reference to an HTML element (e.g., an iFrame) which enables the insertion of a nested portion (e.g., the nested portion 272 described herein) into the merchant web page 650. Because the nested portion can be defined by one or more HTML documents served by the payment service 340, the web browser 350 can communicate directly with the payment service 340 (e.g., without communicating with the merchant 350) when requests are made by the web browser 350 to the payment service servers 342 through the nested portion of the merchant web page 650. For example, a user may request to complete a purchase transaction using a second control (e.g., the "review order" button 267 or the "Buy Now" button 268 of FIG. 2B) of the transaction display object. Because the transaction display object is within the nested portion and thus served by the payment service 340, the request to complete the purchase transaction is communicated directly from the web browser 350 to the payment service 340 and processed by the payment service 340.

At events 7 and 8 of FIG. 3, the information requested by the web browser 350 is returned by the payment service 340. For example, at event 7, the information related to the first control may be sent to the web browser 350 by the payment service 340. For example, one or more image servers 341 may return the image file graphically representing the first control (e.g., representing a checkout button) at event 7. At event 8, the web page coding of the payment service 340 requested by the web browser 350 is sent to the browser 350 by the payment service 340. For example, JavaScript code from the payment service 340 may be returned to the web browser 350. As described herein, the web page coding can cause a transaction display object to be displayed which may include a second control that is selectable by the user such that the user can complete the purchase transaction without navigating away from the merchant web page 650.

At event 9, in response to user selection of the first control (e.g., a checkout button), transaction information is sent to the payment service 340 from the web browser 350. For example, an HTML form including transaction information may be sent to a server 342 (e.g., one of the checkout servers 345) of the payment service 340. The HTML form may include information including, but not limited to, formatting information for the merchant web site (e.g., title, HTML formatting information), information relating to the merchant (e.g., a merchant ID), shopping cart information, the item(s) the user wants to purchase (e.g., the item or items in the user's shopping cart). A checkout service application 343 running on the checkout server 345 may send the HTML form to an order form processor application 346.

At event 10 in FIG. 3, the order form processor application 346 validates the information from the HTML form and returns widget information back to the checkout service 343. For example, the processor application 346 may check that the information in the HTML form complies to certain standards (e.g., that the form is HTML compliant) and may check the information in the form related to the merchant (e.g., the merchant ID) to see that the merchant is valid (e.g., has an account with the payment service). The widget information is then sent back to and displayed by the web browser 350. For example, the information may be the web page coding used to generate the transaction display object within the nested portion of the merchant web page, as described herein. The transaction information may include one or more identifiers (e.g., a shopping cart ID, a merchant ID, or both) that identifies the information as being associated with a user, a merchant, or both. As described herein, the transaction display object 260 can include a second control that is selectable by the user such that the user can complete the purchase transaction without navigating away from the web page. For example, the user may be able to checkout in a variety of different manners (e.g., using the quick checkout button 267 or the instant checkout button 268 described herein with respect to FIG. 2, among other possibilities).

At event 11 of FIG. 3, the user selects the quick checkout button and transaction information is communicated to the payment service 340. For example, the one or more identifiers (e.g., the shopping cart ID, the merchant ID, or both) may be submitted to the checkout servers 345 of the payment service 340 via the HTML form. In certain embodiments, the first authentication object (e.g., including one or more customer cookies) is also sent from the web browser 350 to the payment service 340 at event 11. At event 12, if the user is a recognized user, the checkout service application 343 can cause the transaction display object on the merchant web page 650 to be updated with details of the transaction such as the details described above with respect to FIG. 2G. As discussed, the transaction display object can be displayed on the nested portion of the merchant web page using an iFrame.

At event 13, the user indicates they would like to place their order by, for example, selecting a confirmation button (e.g., the confirmation button 290 of FIG. 2G). The checkout service application 343 of the payment service can then process the payment on behalf of the merchant. At event 14 the application service 343 updates the transaction display object to display post-checkout information such as the thank you message 263 and order confirmation number 265 described above with respect to FIG. 2C. At operational event 15, if the user indicates they would like to continue by, for example, clicking on the close window button 269 of FIG. 2C, the nested portion of the merchant web page will be closed. In some embodiments the user may then be forwarded to either a merchant web page in which they can continue shopping, to another web page of the merchant's choosing, or to some other web page. The merchant may be notified of the success or failure of the payment processing and/or completion of the purchase transaction by the payment service through various mechanisms. For example, in some embodiments, the payment service 340 directs the user to a pre-determined web page of the merchant such that the merchant can determine whether or not the payment has been processed successfully. The merchant may, for example, send the payment service 340 one or more URL's of pre-determined web pages that the payment service should redirect the customer to during one of the events described above (e.g., at event 9). The URL may include, for example, the transaction ID for the purchase transaction and information as to whether the transaction was successful. There may be one URL for a successful transaction and another URL for a failed transaction, for example. The URL may also include information as to reasons why the transaction failed. The redirection will cause the customer's browser 312 to request the web page of the merchant, which will allow the merchant to analyze the requested URL and determine whether or not the payment processing was successful. Other notification mechanisms may be used instead of, or in addition to, redirection. For example, in some embodiments, the merchant and/or customer are notified by e-mail whether or not the transaction was successful. In some configurations, an RSS feed that the merchant can poll may be implemented by the payment service 340 and provide information related to the success or failure of transactions.

Those of skill in the art will appreciate that alternative configurations are possible. For example, in other configurations the web page coding may include some other scripting language such as dynamic-HTML or Adobe Flash, instead of, or in addition to, JavaScript. In some embodiments, one or more other components instead of, or in addition to, the image file and web page coding are referenced by the document (e.g., an HTML document) which defines the merchant web page.

The events 1-15 and the various illustrated components of the customer computing device 310, the merchant 330 and the payment service 340 are representative of certain embodiments and are not intended to be limiting. In certain embodiments, one or more of the data flow branches 1-15 may not be included, one or more additional events may be included, or both. Moreover, in certain embodiments, the one or more of the illustrated components of the customer computing device 310, the merchant 330 and the payment service 340 may not be present, one or more additional components may be included, or both. For example, in some embodiments, the order form processor 346 is not a separate component and is implemented on one of the servers 342 of the payment service system.

Part of the data flow operations described with respect to FIG. 3 may be performed by one or more parties not included in the diagram in certain embodiments.

Figure 4:
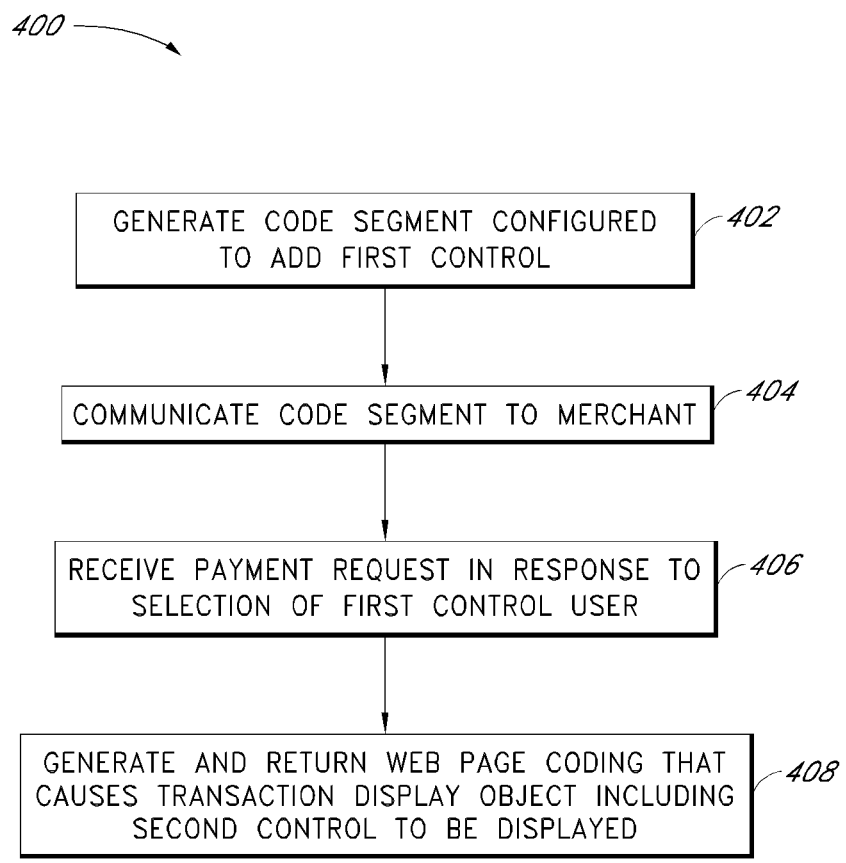
FIG. 4 illustrates an embodiment of a process for providing a hosted payment service.

FIG. 4 illustrates an embodiment of a process 400 for providing a payment service. The process 400 is implemented in one embodiment on a network topology 100 of FIG. 1. The process 400 of certain embodiments is implemented using embodiments of the payment service illustrated by the screen shots of FIGS. 2A-2H. The process 400 provides a payment service without navigating away from a web page of the merchant.

At block 402, the process 400 generates a code segment adapted to be added to web page coding of a merchant web site of the merchant. At block 404, the process 400 communicates the code segment to the merchant. The code segment of certain embodiments is configured to add a first control that enables users to invoke the payment service from the merchant web site to purchase items. The code segment and first control may be similar to the code segment and first control described herein with respect to FIGS. 1-3. For example, the first control may be a selectable button which allows the user to select to pay using the payment service instead of the paying through the merchant web site.

At block 406, the process 400 receives, at a server of the payment service, a request from a computing device of a user who is registered with the payment service. The request can be generated in response to user selection of the first control as displayed on a web page of the merchant web site. The request may include transaction information for performing a purchase transaction in which payment is collected by the payment service on behalf of the merchant. The transaction information can include checkout information (e.g., shopping cart information).

The process responds to the request at block 408 by generating and returning web page coding that causes a transaction display object to be displayed on the user computing device within the web page. The transaction display object can include a second control that is selectable by the user such that the user can complete the purchase transaction without navigating away from the web page. In certain embodiments, the second control includes an instant checkout option. The second control can include at least one additional checkout option. For example, the at least one additional checkout option can allow the user to review and confirm information relating to the transaction before completing the transaction. The at least one additional checkout option can be the quick checkout option described above with respect to FIG. 2G, or some other checkout option.

In certain embodiments, the transaction display object is at least partially displayed within an overlay display object. In certain embodiments, as described in greater detail with respect to FIG. 2E and FIG. 3, the merchant web page includes a main portion defined by a first document and a nested portion defined by a second document. The second document can be served at least in part by a server of the payment service and the transaction display object can be displayed at least in part within the nested portion. The web page coding is configured to cause checkout confirmation information to be displayed within the transaction display object before the user can complete the purchase transaction. The transaction display object can include at least some of the transaction information in certain embodiments.

The process 400 can further include processing a user authentication object received from the computing device of the user. The user authentication object may be based on a first authentication input and the generating and returning the web page coding at block 408 can be based at least in part on the processing of the user authentication object. The process 400 can further include processing a secondary authentication input which can be input by the user into the transaction display object such that whether the user can complete the electronic transaction using the second control is based at least in part on the processing of the secondary authentication input. In certain embodiments, the secondary authentication input includes a personal identification number. The secondary authentication input can be used for multiple checkout sessions without being reset.

Figure 5:
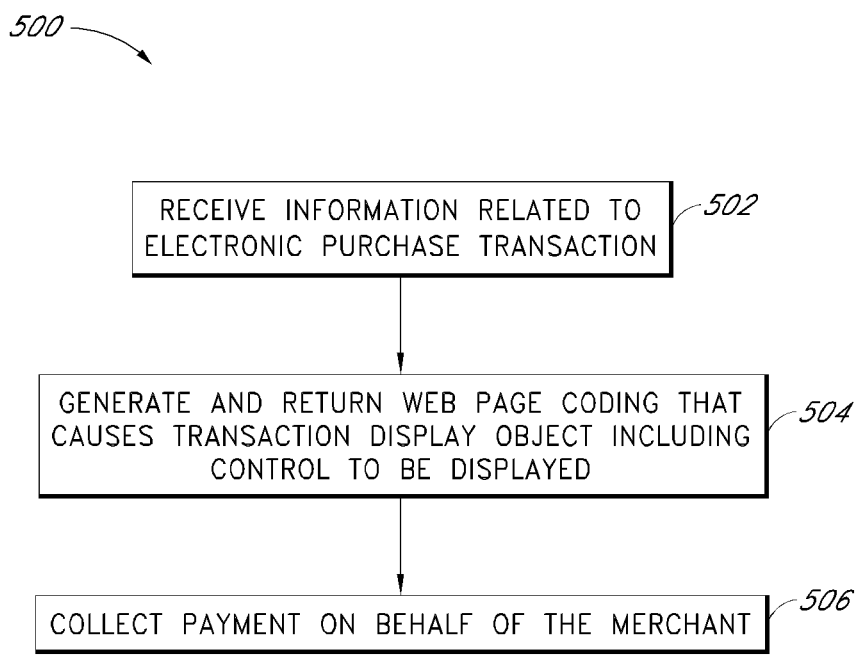
FIG. 5 illustrates another embodiment of a process for providing a hosted payment service.

FIG. 5 illustrates an embodiment of a process for providing a payment service. The process 500 is implemented in one embodiment on a network topology 100 of FIG. 1. The process 500 of certain embodiments is implemented using embodiments of the payment service illustrated by the screen shots of FIGS. 2A-2H. The process 500 provides a payment service without navigating away from a web page of the merchant.

At operational block 502, the process includes receiving information related to an electronic purchase transaction from a user who is registered with the payment service, the electronic purchase transaction to be performed on a web page of a merchant. The web page of the merchant is configured to allow a user to initiate the electronic transaction. The process includes generating and returning web page coding at operational block 504 that causes a transaction display object to be displayed on a user computing device within the web page, the transaction display object includes a control that is selectable by the user such that the user can complete the purchase transaction without navigating away from the web page. At operational block 506, the process includes collecting payment for the electronic purchase transaction on behalf of the merchant.

As described herein, the transaction display object can displayed in an overlay display object in some embodiments. In certain embodiments, and as described herein, the web page includes a main portion defined by a first document and a nested portion defined by a second document, the second document served at least in part by a server of the payment service, the transaction display object displayed at least in part within the nested portion.

The process 500 can further include receiving a user authentication object from the computing device of the user. The user authentication object may be one of the user authentication objects described herein, or another user authentication object. The user authentication object can be based on a first authentication input the processing the electronic transaction based at least in part on the first authentication input. The process 500 can further include receiving a secondary authentication input into the transaction display object and wherein the processing the electronic transaction is based at least in part on the secondary authentication input. As described herein, the secondary authentication input may include a secondary PIN.

Each of the processes and algorithms described above may be embodied in, and fully automated by, code modules executed by one or more computers or computer processors. The code modules may be stored on any type of computer-readable medium or computer storage device. The processes and algorithms may also be implemented partially or wholly in application-specific circuitry. The results of the disclosed processes and process blocks may be stored, persistently or otherwise, in any type of computer storage.

For purposes of illustration, the processes are described primarily in the context of a system that processes payments for purchase transactions from a web page of a merchant web site. As will be apparent, however, the disclosed processes can also be used in other types of systems, and can be used for other purposes or in other contexts. For example, the disclosed processes can be used to provide third party authentication for non-payment related transactions. In certain embodiments, the disclosed processes can be used to authenticate subscribers who are registered with service providers, such as, for example, media service providers. In one embodiment, the disclosed processes can be used to provide processing and authentication of electronic vote tallying or survey information on behalf of another party. Further, the processes may be used to process payments from a web page other than a web page of the merchant from which a purchase is being made. For example, in one embodiment, the processes can be used to allow a user to purchase items from a merchant which are available for purchase (e.g., through advertisements) on another web site, such as a web log (or "blog"). In addition, the disclosed processes can also be implemented in other types of interactive systems that enable users to conduct transactions using documents accessed over a network.

The various features and processes described above may be used independently of one another, or may be combined in various ways. All possible combinations and sub-combinations are intended to fall within the scope of this disclosure. In addition, certain method or process steps may be omitted in some implementations.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although this disclosure has been described in terms of certain example embodiments and applications, other embodiments and applications that are apparent to those of ordinary skill in the art, including embodiments and applications that do not provide all of the benefits described herein, are also within the scope of this disclosure. The scope of the inventions is defined only by the claims, which are intended to be construed without reference to any definitions that may be explicitly or implicitly included in any of the incorporated-by-reference materials.

What is claimed is:

1. A computer-implemented method of providing a hosted payment service, the method comprising:
    by execution of program code by one or more computing devices of the hosted payment service:
        receiving an indication of a user selection of a control displayed within a merchant web page displayed by a browser of a user computing device, the control being part of a widget implemented in the merchant web page;
        in response to said receiving, providing first web page content for display by the browser which allows a user to input authentication information without exposing the authentication information to the merchant, the first web page content overlaying some but not all of the content in the merchant web page;
        receiving the authentication information, the authentication information having been communicated from the user computing device without being exposed to the merchant;
        determining that the user is authorized to complete a purchase transaction based on the received authentication information;

subsequent to said determining, providing second web page content for display by the browser which displays: (i) an indication of one or more selected items for purchase which are included in an electronic shopping cart, (ii) a control for updating the electronic shopping cart; and (iii) one or more of a default shipping address and a default payment method, wherein the second web page content represents an element within the merchant web page and is formatted to replace the first web page content within the merchant web page, to overlay some but not all of the content of the merchant web page, and to allow the user to place an order with the merchant, wherein the second web page content includes a control selectable by the user such that the user can place the order without navigating away from the merchant web page, and wherein the element is defined within the merchant web page as nested within a remainder of the merchant web page; and subsequent to receiving an indication that the user placed the order, initiating collection of payment for the purchase transaction on behalf of the merchant.

2. The method of claim 1, wherein the first and second web page content are displayed in one or more web pop-overs.

3. The method of claim 1, wherein the second web page content indicates one or more items included in a shopping cart for purchase.

4. The method of claim 1, wherein the second web page content includes the merchant name.

5. The computer-implemented method of claim 1, wherein the element is a hypertext markup language (HTML) element.

6. The computer-implemented method of claim 5, wherein the hypertext markup language element includes a uniform resource identifier (URI) for the hosted payment service.

7. The computer-implemented method of claim 6, wherein receiving the indication of the user selection of the control displayed within the merchant web page comprises receiving a request at the URI, the request generated at the merchant web page in response to the user selection.

8. The server system of claim 5, wherein the element is a hypertext markup language element that includes a uniform resource identifier (URI) for the hosted payment service.

9. Non-transitory computer storage that stores executable instructions that direct a computing system to at least:

receive an indication of a user selection of a control displayed within a merchant web page displayed by a browser of a user computing device, the control being part of a widget implemented in the merchant web page;

in response to said receiving, provide first web page content for display by the browser which allows a user to input authentication information without exposing the authentication information to the merchant, the first web page content overlaying some but not all of the content in the merchant web page;

receive the authentication information, the authentication information having been communicated from the user computing device without being exposed to the merchant;

determine that the user is authorized to complete a purchase transaction based on the received authentication information;

subsequent to said determining, provide second web page content for display by the browser which displays: (i) an indication of one or more selected items for purchase which are included in an electronic shopping cart, (ii) a control for updating the electronic shopping cart; and (iii) one or more of a default shipping address and a default payment method, wherein the second web page content represents an element within the merchant web page and is formatted to replace the first web page content within the merchant web page, to overlay some but not all of the content of the merchant web page, and to allow the user to place an order with the merchant, wherein the second web page content includes a control selectable by the user such that the user can place the order without navigating away from the merchant web page, and wherein the element is defined within the merchant web page as nested within a remainder of the merchant web page; and subsequent to receiving an indication that the user placed the order, initiate collection of payment for the purchase transaction on behalf of the merchant.

10. The non-transitory computer storage of claim 9, wherein the first and second web page content are displayed in one or more web pop-overs.

11. The non-transitory computer storage of claim 9, wherein the second web page content indicates one or more items included in a shopping cart for purchase.

12. The non-transitory computer storage of claim 9, wherein the second web page content includes the merchant name.

13. A server system comprising one or more physical servers that respond to requests relating to prospective purchases from user computing devices, said server system programmed to at least:

receive an indication of a user selection of a control displayed within a merchant web page displayed by a browser of a user computing device, the control being part of a widget implemented in the merchant web page;

in response to said receiving, provide first web page content for display by the browser which allows a user to input authentication information without exposing the authentication information to the merchant, the first web page content overlaying some but not all of the content in the merchant web page;

receive the authentication information, the authentication information having been communicated from the user computing device without being exposed to the merchant;

determine that the user is authorized to complete a purchase transaction based on the received authentication information;

subsequent to said determining, provide second web page content for display by the browser which displays: (i) an indication of one or more selected items for purchase which are included in an electronic shopping cart, (ii) a control for updating the electronic shopping cart; and (iii) one or more of a default shipping address and a default payment method, wherein the second web page content represents an element within the merchant web page and is formatted to replace the first web page content within the merchant web page, to overlay some but not all of the content of the merchant web page, and to allow the user to place an order with the merchant, wherein the second web page content includes a control selectable by the user such that the user can place the order without navigating away from the merchant web page, and wherein the element is defined within the merchant web page as nested within a remainder of the merchant web page; and subsequent to receiving an indication that the user placed the order, initiate collection of payment for the purchase transaction on behalf of the merchant.

14. The server system of claim 13, wherein the first and second web page content are displayed in one or more web pop-overs.

15. The server system of claim 13, wherein the second web page content indicates one or more items included in a shopping cart for purchase.

16. The server system of claim 13, wherein the second web page content includes the merchant name.

\* \* \* \* \*

UNITED STATES PATENT AND TRADEMARK OFFICE
CERTIFICATE OF CORRECTION

PATENT NO. : 10,528,931 B1
APPLICATION NO. : 15/078958
DATED : January 7, 2020
INVENTOR(S) : Ashish Agrawal et al.

Page 1 of 1

It is certified that error appears in the above-identified patent and that said Letters Patent is hereby corrected as shown below:

On the Title Page

On Page 3, Column 2, Item (56), Line 12, under Other Publications, delete "Transation" and insert --Transaction--.

On Page 3, Column 2, Item (56), Line 39, under Other Publications, delete "Credict" and insert --Credit--.

In the Claims

In Column 19, Line 45, Claim 8, delete "server system" and insert --computer-implemented method--.

Signed and Sealed this
Seventh Day of April, 2020

Andrei Iancu
*Director of the United States Patent and Trademark Office*